(12) United States Patent
Olden

(10) Patent No.: US 11,636,520 B1
(45) Date of Patent: Apr. 25, 2023

(54) BLOCKCHAIN-BASED DIGITAL ADVERTISING AND MARKETING SYSTEM AND METHOD

(71) Applicant: Matthew R Olden, Las Vegas, NV (US)

(72) Inventor: Matthew R Olden, Las Vegas, NV (US)

( * ) Notice: Subject to any disclaimer, the term of this patent is extended or adjusted under 35 U.S.C. 154(b) by 0 days.

(21) Appl. No.: 17/330,399

(22) Filed: May 25, 2021

Related U.S. Application Data

(63) Continuation of application No. 17/203,713, filed on Mar. 16, 2021, now abandoned.

(60) Provisional application No. 63/159,992, filed on Mar. 11, 2021, provisional application No. 62/989,959, filed on Mar. 16, 2020.

(51) Int. Cl.
| | |
|---|---|
| *G06Q 30/02* | (2023.01) |
| *G06Q 30/0273* | (2023.01) |
| *G06Q 30/0241* | (2023.01) |
| *G07F 17/32* | (2006.01) |
| *G06N 20/00* | (2019.01) |
| *G06Q 20/38* | (2012.01) |
| *G06Q 50/00* | (2012.01) |

(52) U.S. Cl.
CPC ..... *G06Q 30/0273* (2013.01); *G06Q 30/0277* (2013.01); *G07F 17/323* (2013.01); *G06N 20/00* (2019.01); *G06Q 20/389* (2013.01); *G06Q 30/0248* (2013.01); *G06Q 50/01* (2013.01)

(58) Field of Classification Search
CPC .......... G06Q 30/0273; G06Q 30/0277; G06Q 20/389; G06Q 30/0248; G06Q 50/01; G07F 17/323; G06N 20/00
See application file for complete search history.

(56) References Cited

U.S. PATENT DOCUMENTS

| | | | | |
|---|---|---|---|---|
| 10,740,804 | B2 * | 8/2020 | Spivack | G06F 3/04883 |
| 11,314,722 | B2 * | 4/2022 | Pierce | H04L 9/3268 |
| 11,397,968 | B2 * | 7/2022 | Brown | H04N 21/23424 |
| 11,436,215 | B2 * | 9/2022 | Choi | G06F 16/22 |
| 11,444,976 | B2 * | 9/2022 | Brannon | G06F 21/6263 |
| 11,538,063 | B2 * | 12/2022 | Ko | G06N 5/04 |
| 11,544,513 | B1 * | 1/2023 | Sanderson | G06T 13/80 |
| 11,546,144 | B2 * | 1/2023 | Bartolucci | H04L 9/30 |
| 2019/0107990 | A1 * | 4/2019 | Spivack | A63F 13/80 |
| 2019/0325498 | A1 * | 10/2019 | Clark | G06K 7/1417 |
| 2020/0082126 | A1 * | 3/2020 | Brown | H04L 9/3268 |

(Continued)

OTHER PUBLICATIONS

Chae, 2019, pp. 1-13.*

(Continued)

*Primary Examiner* — Michael I Ezewoko
(74) *Attorney, Agent, or Firm* — Newman Law, LLC

(57) ABSTRACT

A blockchain-based digital advertising and marketing platform for Casinos, Lottery, and iGaming Operators which generally includes a private blockchain upon which both a supply-side platform and a demand-side platform along with a dynamic content generator software to operate using artificial intelligence and machine learning, business intelligence software and search engine technology, to provide an advertising rules service, gamified product offers, coupons and mailers utilizing augmented reality or virtual reality, an interactive game wall, connected to hardware and software interfaces of casino and lottery operators.

1 Claim, 28 Drawing Sheets

(56) References Cited

U.S. PATENT DOCUMENTS

| | | | |
|---|---|---|---|
| 2021/0264444 A1* | 8/2021 | Chen | G06F 16/54 |
| 2022/0058752 A1* | 2/2022 | Candler | G06Q 30/0215 |
| 2022/0147638 A1* | 5/2022 | Brannon | G06V 30/248 |
| 2022/0286438 A1* | 9/2022 | Burke, Jr. | H04L 63/1416 |
| 2022/0351218 A1* | 11/2022 | Karri | G06N 20/00 |

OTHER PUBLICATIONS

Microsoft Computer Dictionary, Microsoft Press, pp. 407-408, 2002.*
Štefanič, Elsevier, 2019, pp. 197-212.*
Kiss, Elsevier, 2019, pp. 99-111.*
Serhani, Elsevier, Mar. 5, 2020, pp. 583-597.*

* cited by examiner

2200

2400

BLOCKCHAIN-BASED DIGITAL ADVERTISING AND MARKETING SYSTEM AND METHOD

FIELD OF INVENTION

The present invention is generally related to blockchain-based digital advertising and marketing systems and methods to provide a platform for Casinos, Lottery, and iGaming Operators over a network.

BACKGROUND OF INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in-and-of-themselves may also be inventions.

Typically, digital advertising and marketing are based on an open system fueled by internet connections. Currently, this openness not only creates immense media-trading opportunities, but it also creates gaps and a lack of transparency in the media supply chain. These challenges make the entire digital advertising and marketing ecosystem vulnerable to fraud. With no source of consistent information and no centralized marketplace, digital advertising lacks a common data source that could identify and prevent fraud. This specification recognizes that there is a need for a distributed database and unified platform that can serve as a single source of truth about advertising and marketing impressions for all the users such as demand and supply partners.

Thus, given the above, there is a long-felt need in the industry to address the aforementioned deficiencies and inadequacies.

Further limitations and disadvantages of conventional and traditional approaches will become apparent to one of skill in the art through comparison of described systems with some aspects of the present disclosure, as outlined in the remainder of the present application and with reference to the drawings.

SUMMARY OF THE INVENTION

A blockchain-based digital advertising and marketing system and method to provide a platform for Casinos, Lottery and iGaming Operators over a network are provided substantially, as shown in and/or described in connection with at least one of the figures.

An aspect of the present disclosure relates to a blockchain-based digital advertising and marketing system which includes a private blockchain upon which both a supply-side platform and a demand-side platform along with a dynamic content generator software operate using artificial intelligence and machine learning, business intelligence software and search engine technology, to provide an advertising rules service, gamified product offers, coupons and mailers utilizing augmented reality or virtual reality, an interactive game wall, connected to hardware and software interfaces of casino and lottery operators.

There has thus been outlined, rather broadly, some of the features of the blockchain digital advertising and marketing platform for Casinos, Lottery, and iGaming Operators so that the detailed description thereof may be better understood, and so that the present contribution to the art may be better appreciated. There are additional features of the blockchain digital advertising and marketing platform for Casinos, Lottery, and iGaming Operators that will be described hereinafter and that will form the subject matter of the claims appended hereto. In this respect, before explaining at least one embodiment of the blockchain digital advertising and marketing platform for Casinos, Lottery, and iGaming Operators in detail, it is to be understood that the blockchain digital advertising and marketing platform for Casinos, Lottery, and iGaming Operators is not limited in its application to the details of construction or the arrangements of the components outlined in the following description or illustrated in the drawings. The blockchain digital advertising and marketing platform for Casinos, Lottery, and iGaming Operators is capable of other embodiments and of being practiced and carried out in various ways. Also, it is to be understood that the phraseology and terminology employed herein are for the description and should not be regarded as limiting. One object is to provide a blockchain digital advertising and marketing platform for Casinos, Lottery, and iGaming Operators for a blockchain digital advertising and marketing platform for the Casinos, Lottery, and iGaming Operators.

Another object is to provide a blockchain digital advertising and marketing platform for Casinos, Lottery, and iGaming Operators that is an immutable, distributed ledger or record of transactions across the network of participants; publishers, advertisers, and viewers.

Another object is to provide a blockchain digital advertising and marketing platform for Casinos, Lottery, and iGaming Operators that is a supply-side platform that connects publisher inventory to multiple ad exchanges, demand-side platforms, and other networks to sell display, video, and mobile ads in an automated fashion to maximize the prices at which impressions are sold.

Another object is to provide a blockchain digital advertising and marketing platform for Casinos, Lottery, and iGaming Operators that is a demand-side platform used to permit advertisers and agencies to help them buy display, video, and mobile advertising in an automated fashion and search ads.

Another object is to provide a blockchain digital advertising and marketing platform for Casinos, Lottery, and iGaming Operators that integrates with casino slot accounting, bonusing, player loyalty systems, and resort lodging management systems to obtain contextual metadata on players and guests.

Another object is to provide a blockchain digital advertising and marketing platform for Casinos, Lottery, and iGaming Operators that integrates custom-developed digital games with casino marketing and bonusing systems to operate tournament-based games sponsored by advertisers.

Another object is to provide a blockchain digital advertising and marketing platform for Casinos, Lottery, and iGaming Operators that provides an advertising rules engine service to permit publishers to write rules that define permissible advertisements or advertisers.

Another object is to provide a blockchain digital advertising and marketing platform for Casinos, Lottery, and iGaming Operators that uses artificial intelligence and machine learning to make event-driven predictions using metadata of players and guests, knowledge mining, patterns, relationships, sentiment, phrases, and other contextual data like time of the day, day of the week, seasonality and more.

Another object is to provide a blockchain digital advertising and marketing platform for Casinos, Lottery, and iGaming Operators that uses artificial intelligence and machine learning and a social affinities interface to build deeper profiles of players and guests from their social network accounts.

Another object is to provide a blockchain digital advertising and marketing platform for Casinos, Lottery, and iGaming Operators that employs digital, shareable, coupons and mailers utilizing augmented reality or virtual reality to broadly share advertiser and publisher offers.

Another object is to provide a blockchain digital advertising and marketing platform for Casinos, Lottery, and iGaming Operators that integrates custom-developed digital games with casino marketing and bonusing hardware solutions to play advertiser-sponsored tournament-based games on electronic gaming machines.

Another object is to provide a blockchain digital advertising and marketing platform for Casinos, Lottery, and iGaming Operators that employs a video game wall of digital displays or LED panels and motion sensing input devices whereby players can interact with and play the custom-developed digital games.

Another object is to provide a blockchain digital advertising and marketing platform for Casinos, Lottery, and iGaming Operators that integrates with digital screens found in casino electronic gaming machines (slot machines), table game signs, hospitality televisions, self-service kiosks, cash access devices, digital signage, and mobile applications.

Another object is to provide a blockchain digital advertising and marketing platform for Casinos, Lottery, and iGaming Operators that provides uniform content delivery through a dynamic content generator utility.

Another object is to provide a blockchain digital advertising and marketing platform for Casinos, Lottery, and iGaming Operators that provides reporting and analytics to both publishers and advertisers.

Another object is to provide a blockchain digital advertising and marketing platform for Casinos, Lottery, and iGaming Operators that provides consolidated billing and invoicing through smart contracts on the blockchain.

Another object is to provide a blockchain digital advertising and marketing platform for Casinos, Lottery, and iGaming Operators that integrates with national coupon redemption service providers.

These features and advantages of the present disclosure may be appreciated by reviewing the following description of the present disclosure, along with the accompanying figures wherein like reference numerals refer to like parts.

BRIEF DESCRIPTION OF DRAWINGS

The accompanying drawings illustrate the embodiments of systems, methods, and other aspects of the disclosure. Any person with ordinary skills in the art will appreciate that the illustrated element boundaries (e.g., boxes, groups of boxes, or other shapes) in the figures represent an example of the boundaries. In some examples, one element may be designed as multiple elements, or multiple elements may be designed as one element. In some examples, an element shown as an internal component of one element may be implemented as an external component in another and vice versa. Furthermore, the elements may not be drawn to scale.

Various embodiments will hereinafter be described in accordance with the appended drawings, which are provided to illustrate, not limit, the scope, wherein similar designations denote similar elements, and in which.

DETAILED DESCRIPTION

Figure 1:
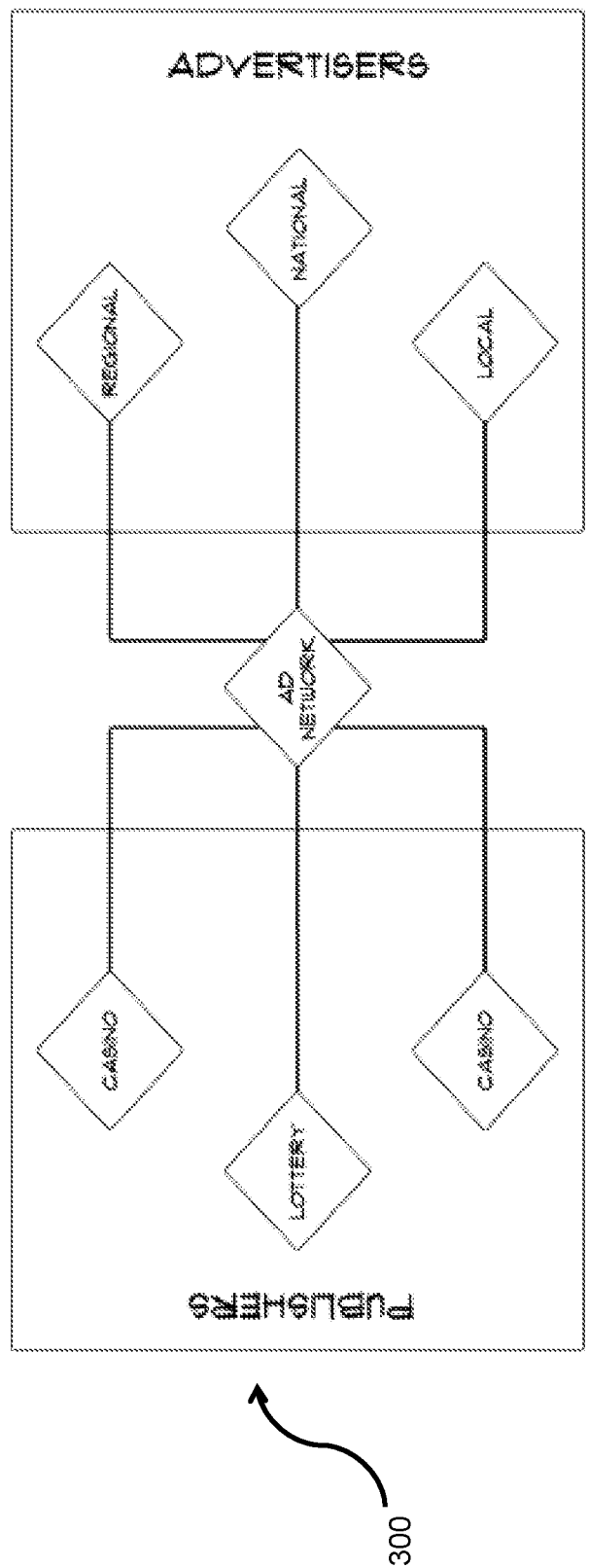
FIG. 1 illustrates a first flowchart of an overall operation of a method and system constructed in accordance with exemplary embodiments of the invention, collectively referred to hereinafter as the "present system".

The present disclosure is best understood with reference to the detailed figures and description set forth herein. Various embodiments have been discussed herein with reference to the figures. However, those skilled in the art will readily appreciate that the detailed descriptions provided herein with respect to the figures are merely for explanatory purposes, as the methods and systems may extend beyond the described embodiments. For instance, the teachings presented and the needs of a particular application may yield multiple alternative and suitable approaches to implement the functionality of any detail described herein. Therefore, any approach may extend beyond certain implementation choices in the following embodiments.

References to "one embodiment," "at least one embodiment," "an embodiment," "one example," "an example," "an exemplary embodiment," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques, and procedures either known to or readily developed from known manners, means, techniques and procedures by practitioners of the art to which the invention belongs. The descriptions, examples, methods, and materials presented in the claims and the specification are not to be construed as limiting but rather as illustrative only. Those skilled in the art will envision many other possible variations within the scope of the technology described herein.

Turning now descriptively to the drawings, in which similar reference characters denote similar elements throughout the several views, the figures illustrate an example embodiment comprising a private blockchain upon which both a supply-side platform and a demand-side platform along with a dynamic content generator software operate using artificial intelligence and machine learning, business intelligence software and search engine technology, to provide an advertising rules service, gamified product offers, coupons and mailers utilizing augmented reality or virtual reality, an interactive game wall, connected to hardware and software interfaces of casino and lottery operators.

FIG. 1 illustrates a first flowchart 100 of an overall operation of the present system, in accordance with an embodiment of the present subject matter. FIG. 1 depicts an overview of the advertising network showing both advertisers and publishers connecting to the network.

In one implementation, the network may be a wireless network, a wired network, or a combination thereof. The network can be implemented as one of the different types of networks, such as an intranet, local area network (LAN), wide area network (WAN), the internet, and the like. The network may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

The system includes a processor and a database. The processor may be implemented as one or more microprocessors, microcomputers, microcontrollers, digital signal processors, central processing units, state machines, logic circuitries, and/or any device(s) that manipulate signals based on operational instructions.

Figure 2:
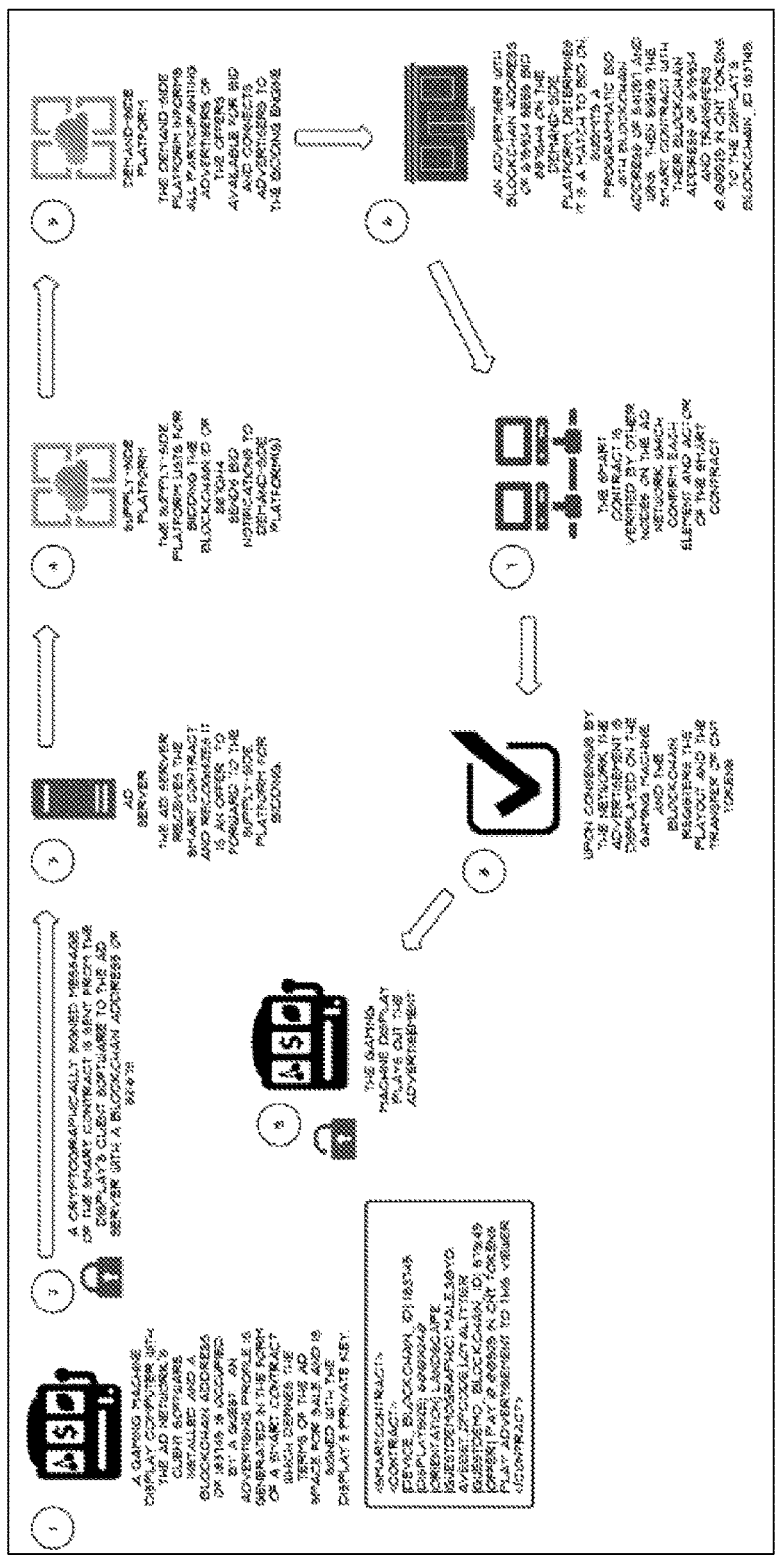
FIG. 2 illustrates a second flowchart of an overall operation of the present system.

FIG. 2 illustrates a second flowchart 200 of an overall operation of the present system, in accordance with an embodiment of the present subject matter. FIG. 2 depicts an overview of a blockchain smart contract advertisement sale.

Figure 3:
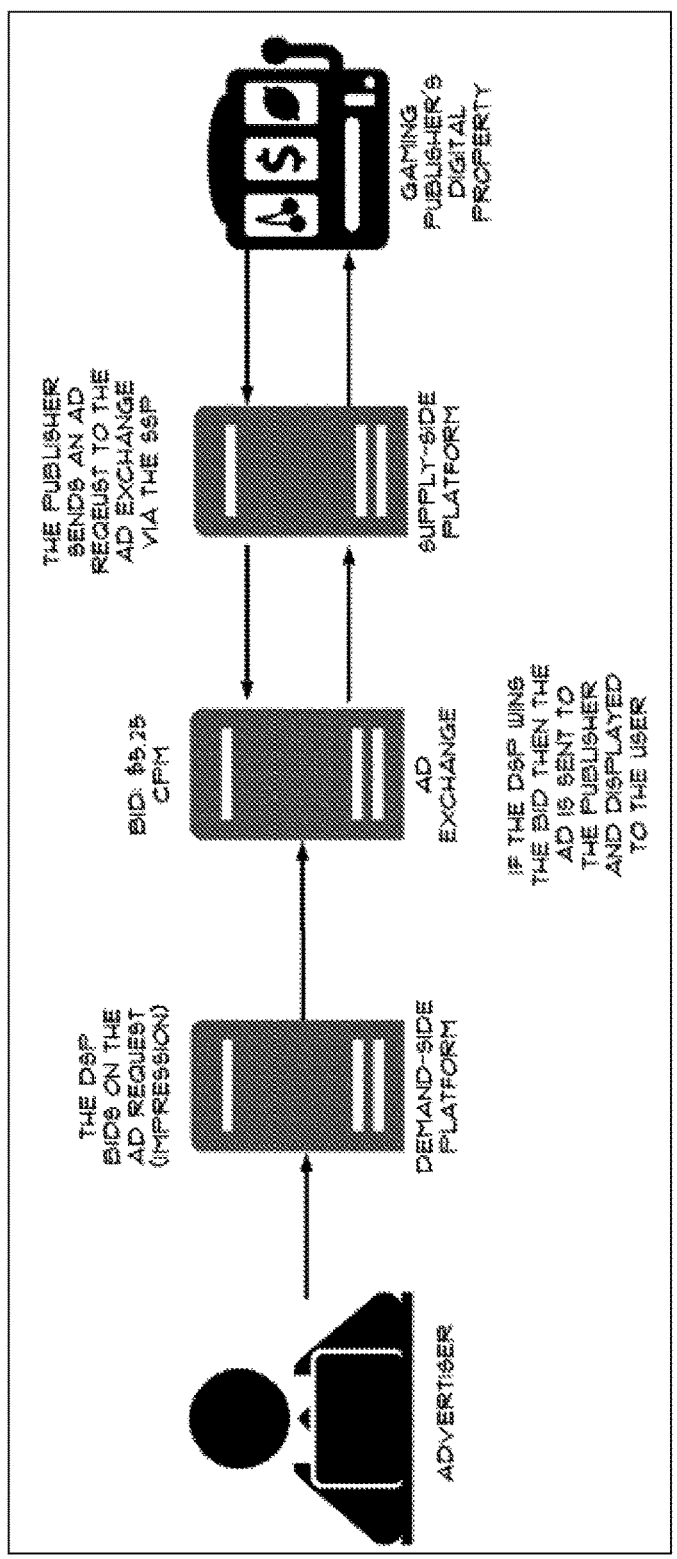
FIG. 3 illustrates a third flowchart of a sub-operation of the present system.

FIG. 3 illustrates a third flowchart 300 of a sub-operation of the present system, in accordance with an embodiment of the present subject matter. FIG. 3 depicts the flow of the supply-side platform and real-time bidding.

Figure 4:
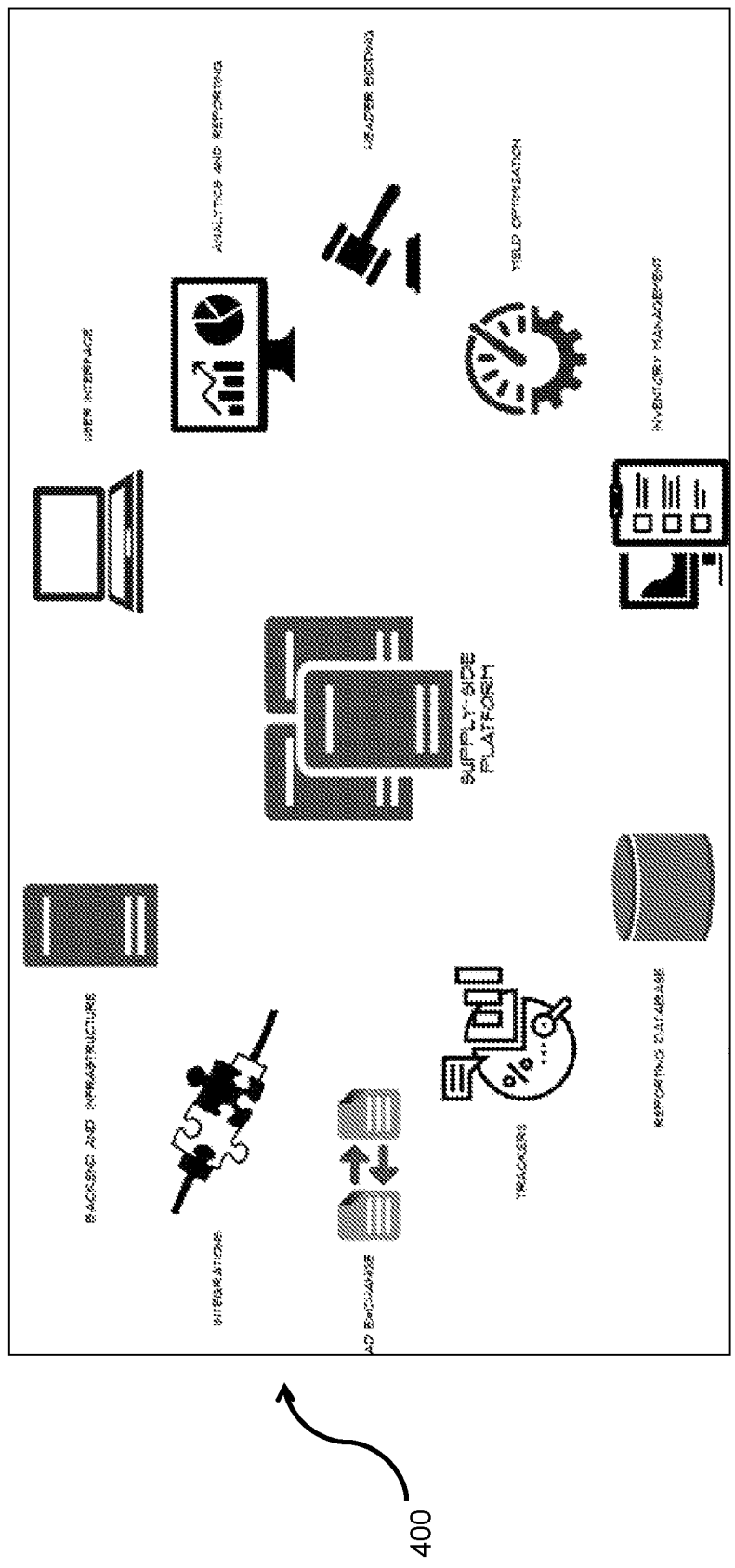
FIG. 4 illustrates a fourth flowchart of a sub-operation of the present system.

FIG. 4 illustrates a fourth flowchart 400 of a sub-operation of the present system, in accordance with an embodiment of the present subject matter. FIG. 4 depicts an overview of supply-side platform components and features.

Figure 5:
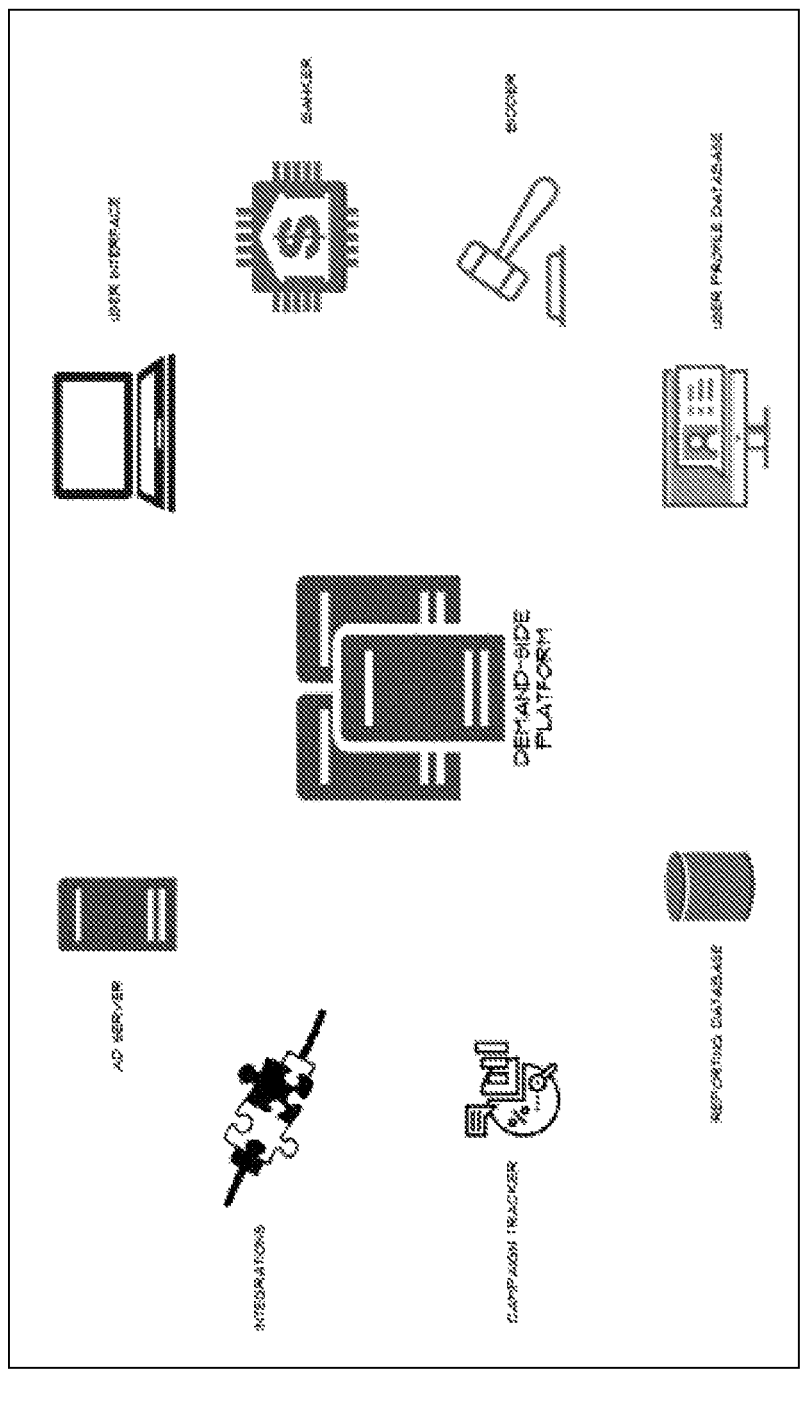
FIG. 5 illustrates a fifth flowchart of a sub-operation of the present system.

FIG. 5 illustrates a fifth flowchart 500 of a sub-operation of the present system, in accordance with an embodiment of the present subject matter. FIG. 5 depicts an overview of demand-side platform components and features.

Figure 6:
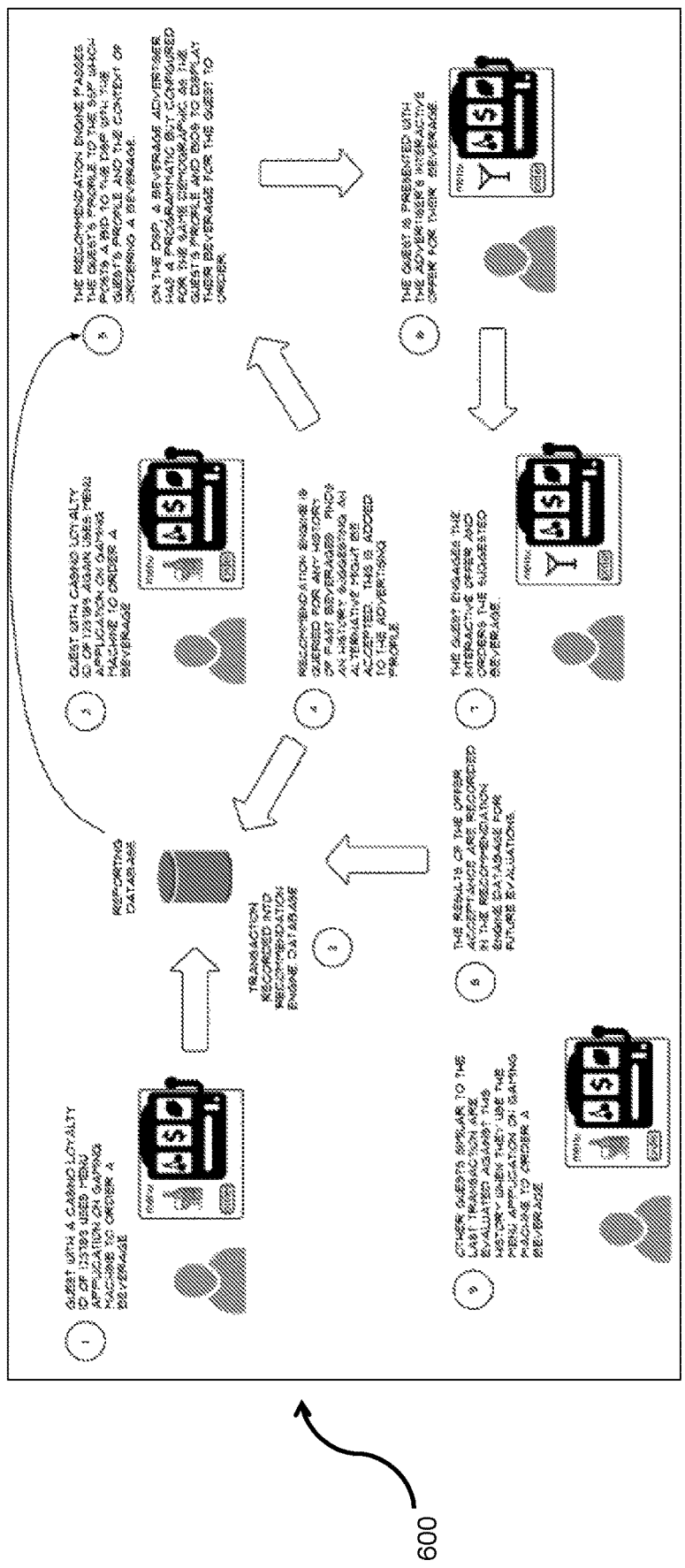
FIG. 6 illustrates a sixth flowchart of a sub-operation of the present system.

FIG. 6 illustrates a sixth flowchart 600 of a sub-operation of the present system, in accordance with an embodiment of the present subject matter. FIG. 6 depicts the usage of artificial intelligence and machine learning in the present invention.

Figure 7:
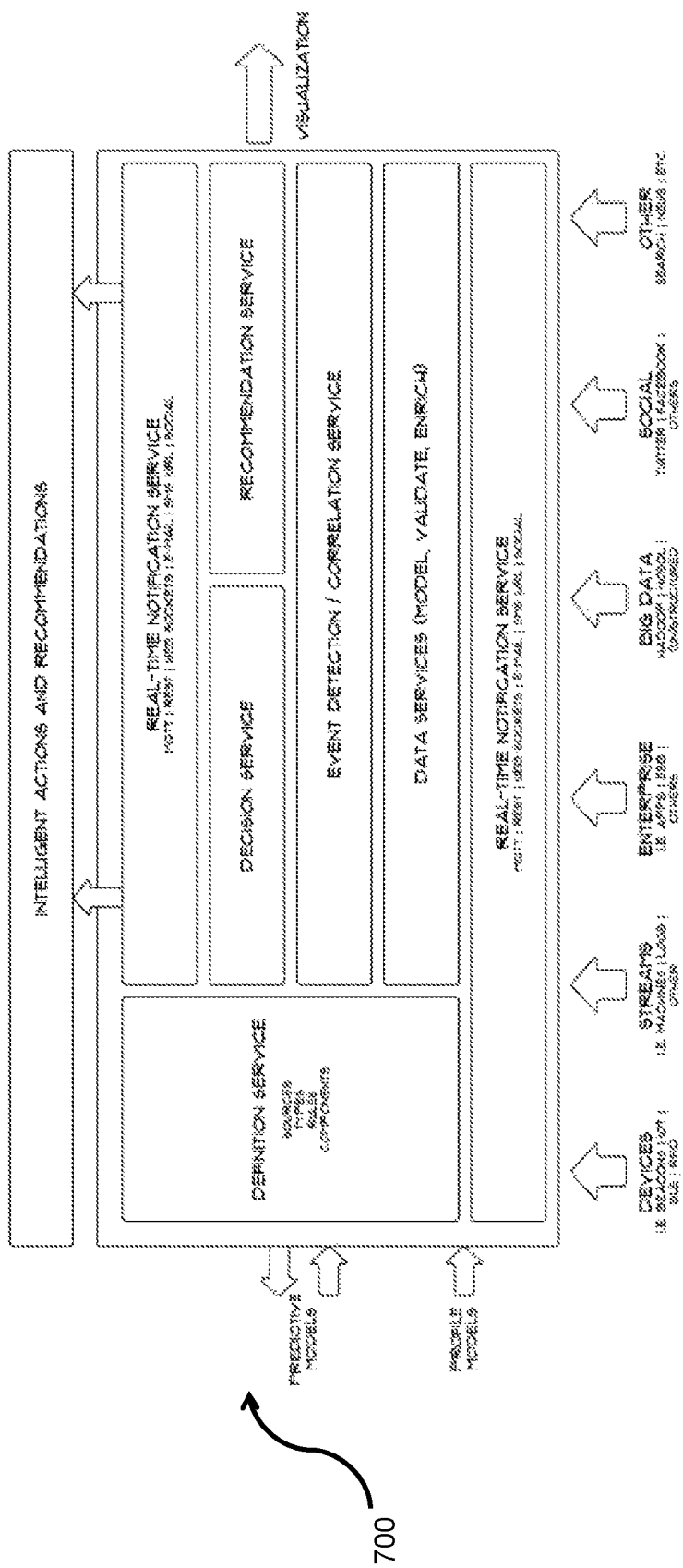
FIG. 7 illustrates a seventh flowchart of a sub-operation of the present system.

FIG. 7 illustrates a seventh flowchart 700 of a sub-operation of the present system, in accordance with an embodiment of the present subject matter. FIG. 7 depicts business intelligence and search engine component architecture.

Figure 8:
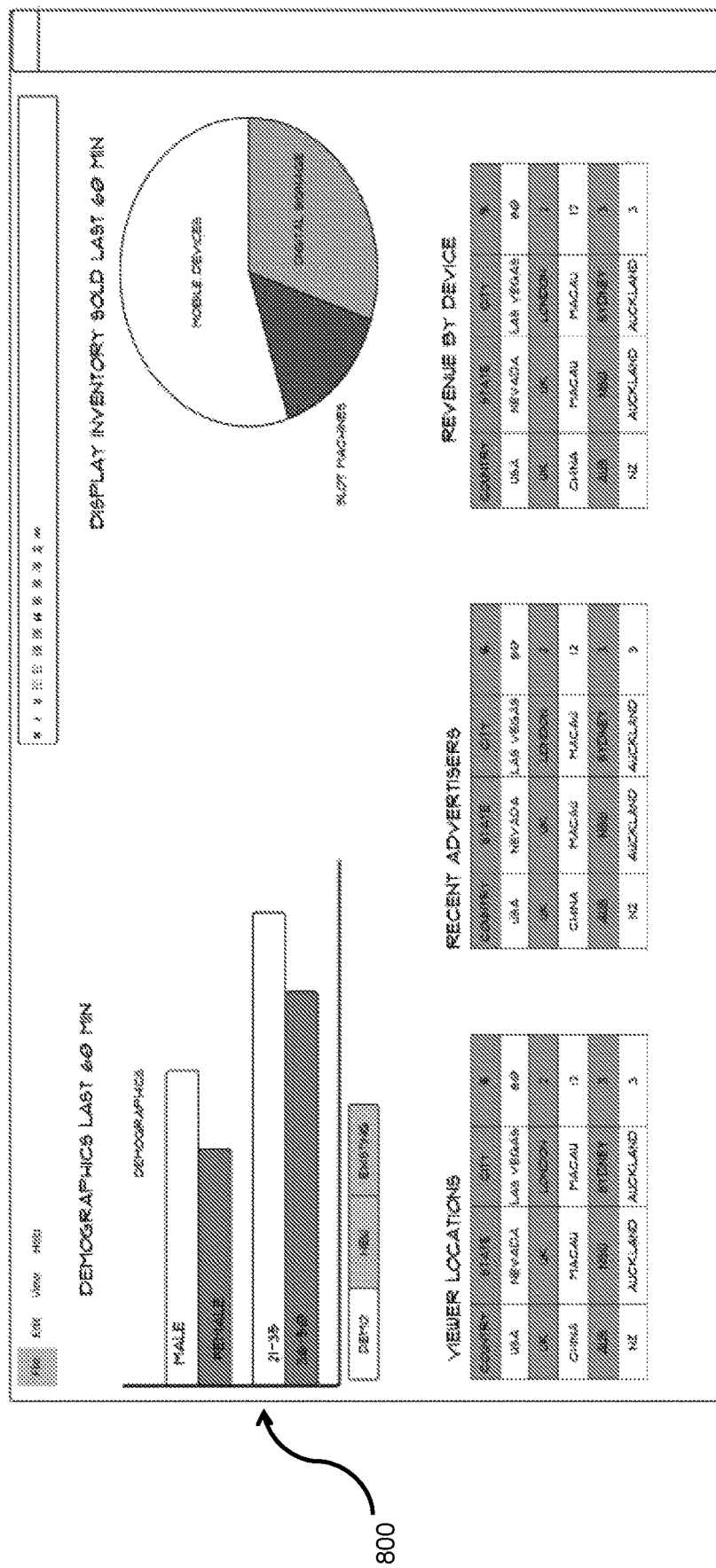
FIG. 8 illustrates an eighth flowchart of a sub-operation of the present system.

FIG. 8 illustrates an eighth flowchart 800 of a sub-operation of the present system, in accordance with an embodiment of the present subject matter. FIG. 8 depicts the business intelligence operator's dashboard mockup.

Figure 9:
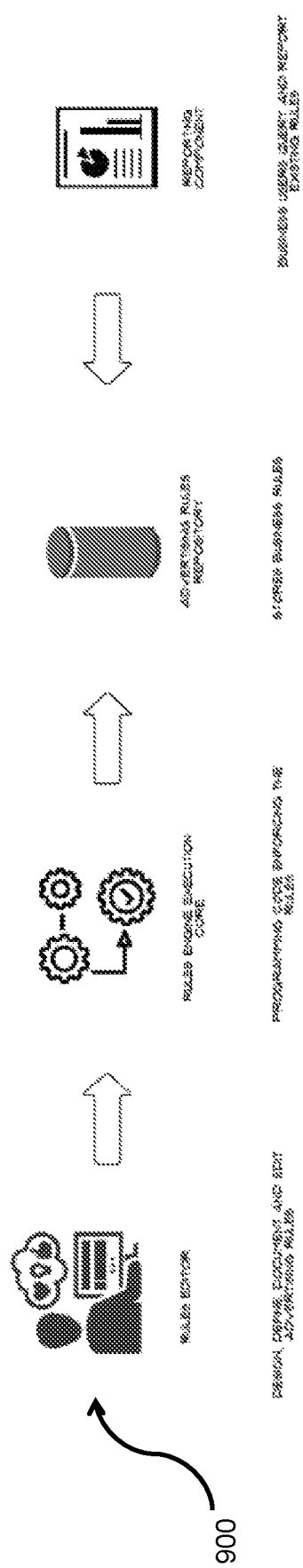
FIG. 9 illustrates a ninth flowchart of a sub-operation of the present system.

FIG. 9 illustrates a ninth flowchart 900 of a sub-operation of the present system, in accordance with an embodiment of the present subject matter. FIG. 9 depicts the components of the advertising rules engine service.

Figure 10:
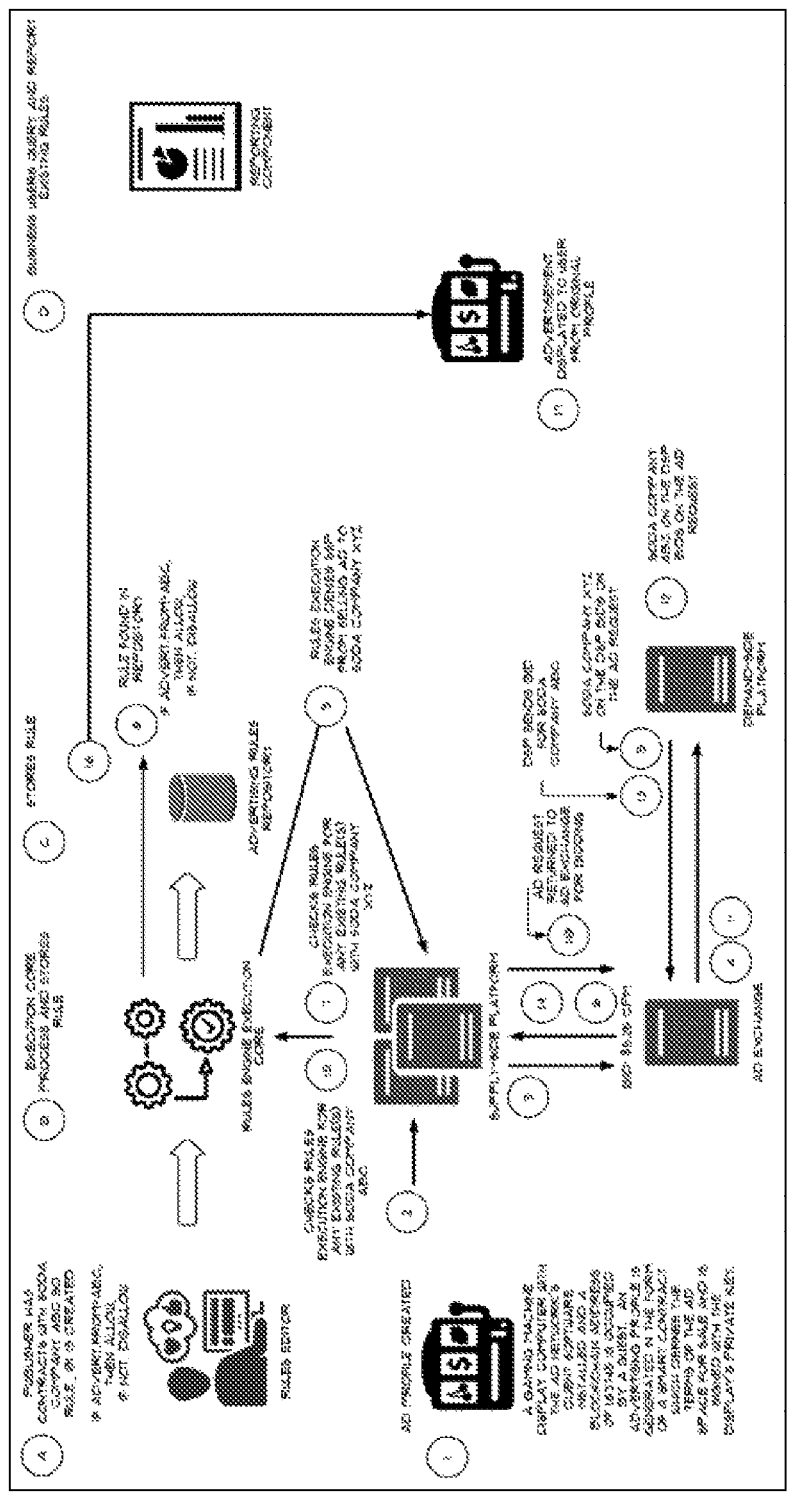
FIG. 10 illustrates a tenth flowchart of a sub-operation of the present system.

FIG. 10 illustrates a tenth flowchart 1000 of a sub-operation of the present system, in accordance with an embodiment of the present subject matter. FIG. 10 depicts the advertising rules engine service flow.

Figure 11:
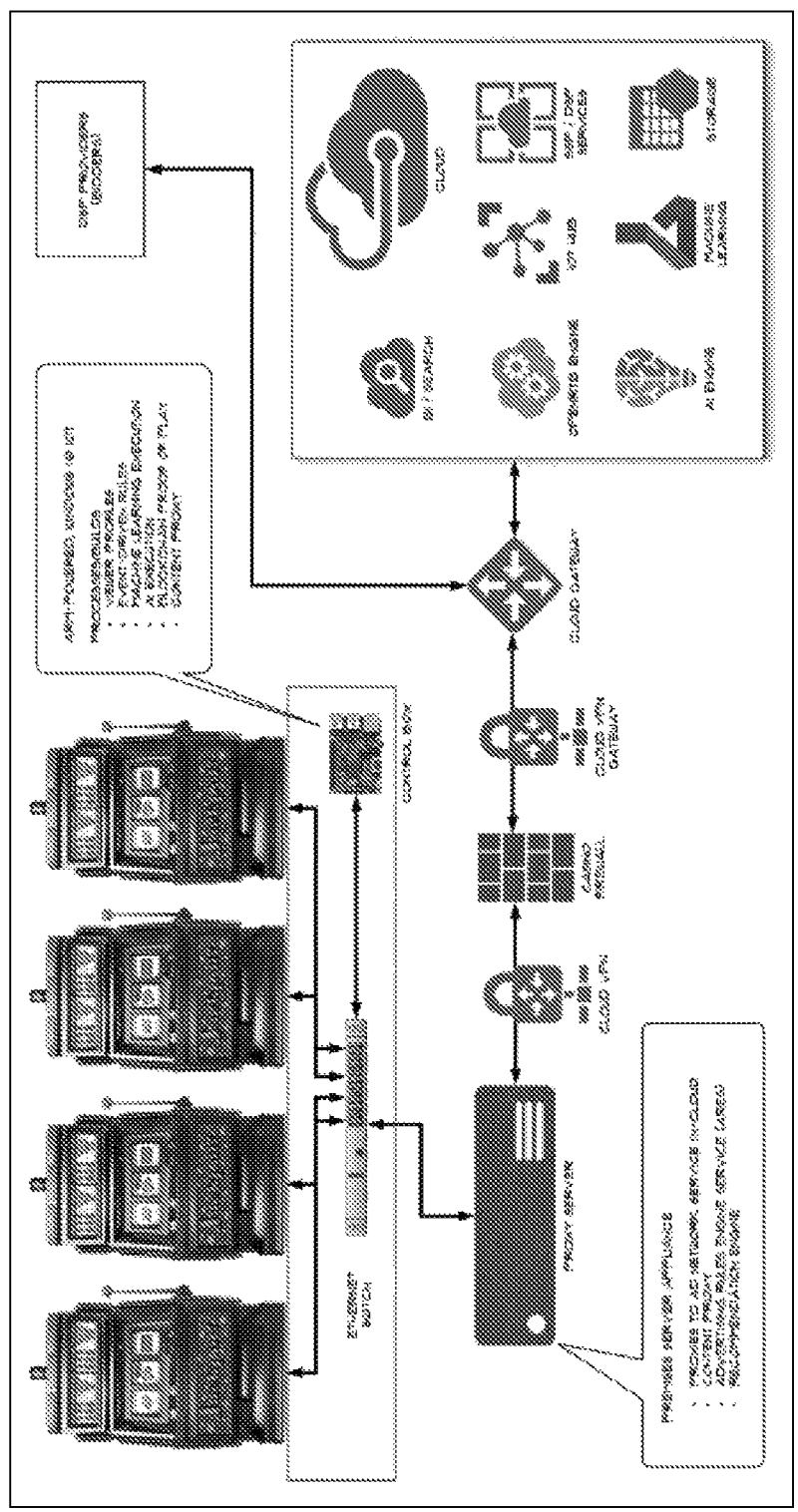
FIG. 11 illustrates an eleventh flowchart of a sub-operation of the present system.

FIG. 11 illustrates an eleventh flowchart 1100 of a sub-operation of the present system, in accordance with an embodiment of the present subject matter. FIG. 11 depicts a representation of the ad network deployment at the casino floor.

Figure 12:
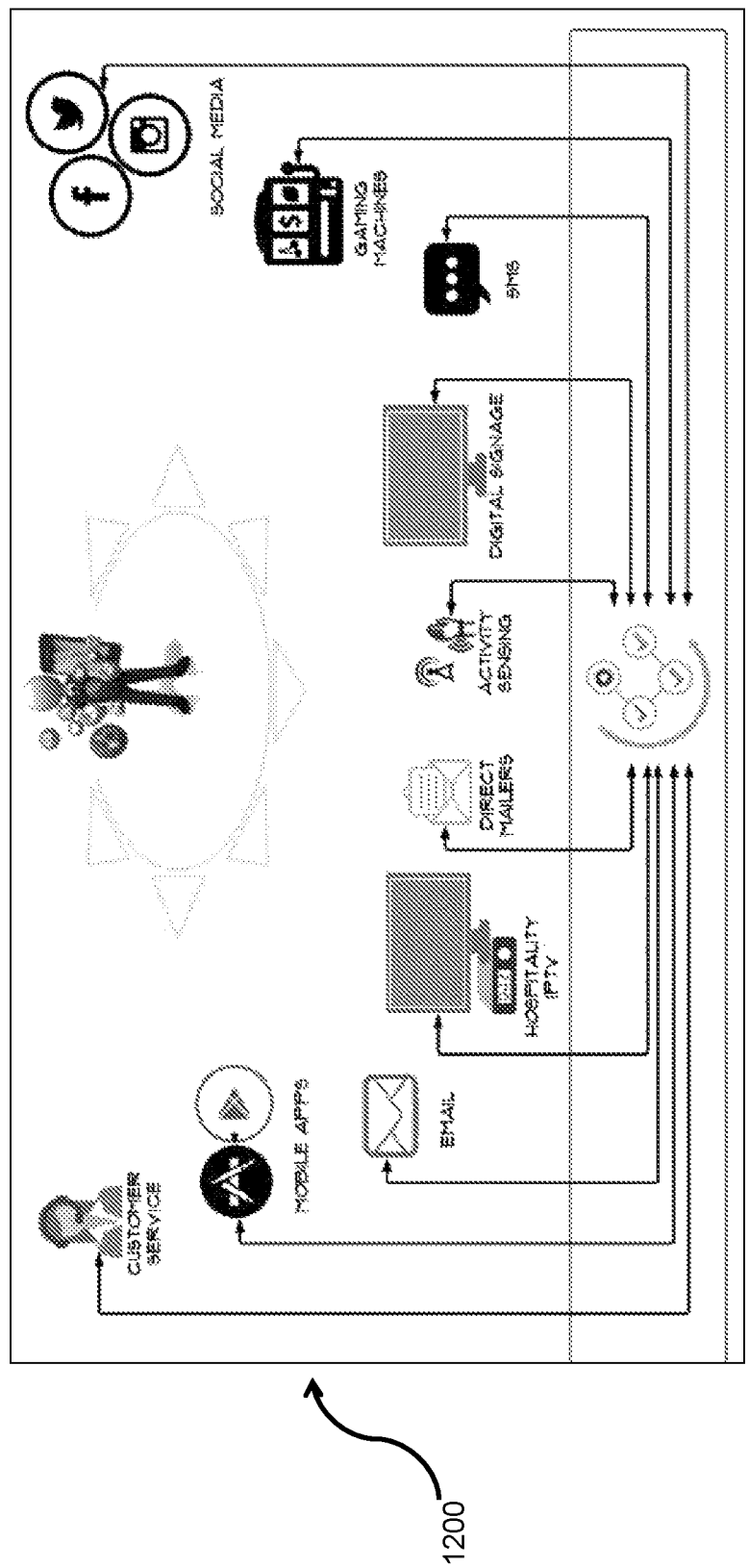
FIG. 12 illustrates a twelfth flowchart of a sub-operation of the present system.

FIG. 12 illustrates a twelfth flowchart 1200 of a sub-operation of the present system, in accordance with an embodiment of the present subject matter. FIG. 12 depicts an overview of the omnichannel contextual engagement.

Figure 13:
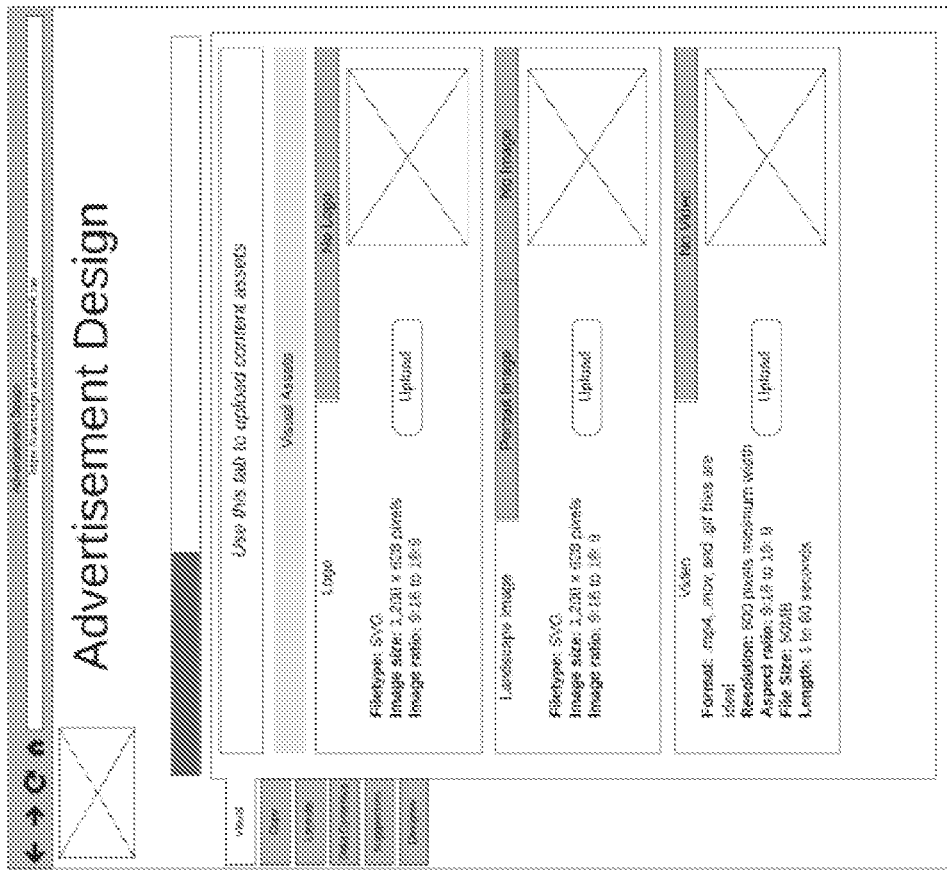
FIG. 13 illustrates a first block diagram of a sub-component of the present system.

FIG. 13 illustrates a first block diagram 1300 of a sub-component of the present system, in accordance with an embodiment of the present subject matter. FIG. 13 depicts the dynamic content generator visual assets configuration screen.

Figure 14:
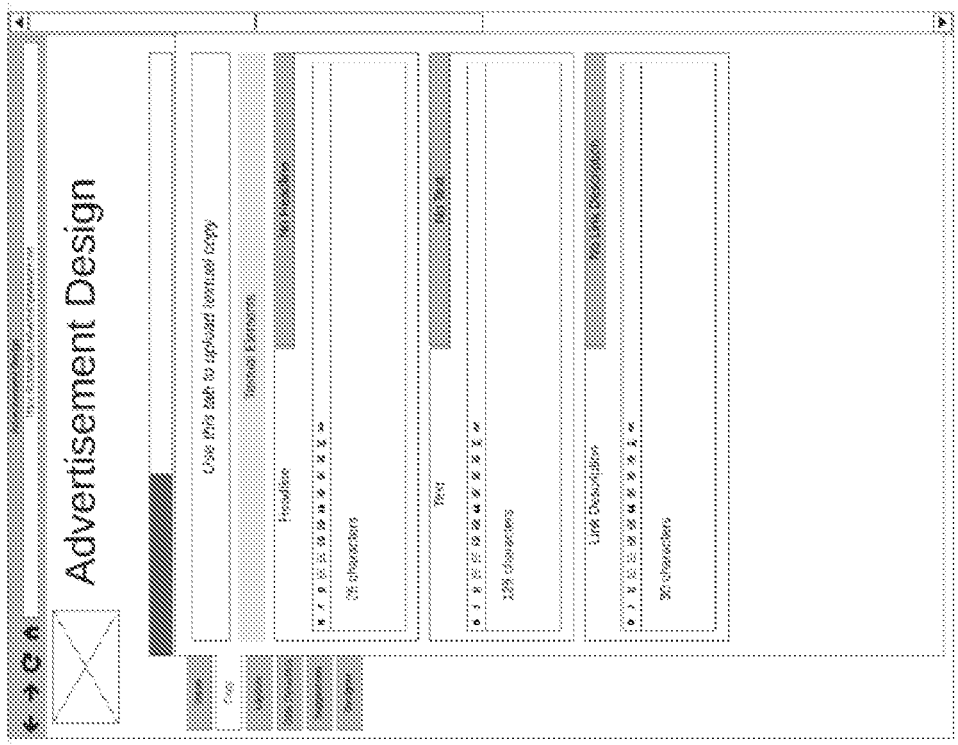
FIG. 14 illustrates a second block diagram of a sub-component of the present system.

FIG. 14 illustrates a second block diagram 1400 of a sub-component of the present system, in accordance with an embodiment of the present subject matter. FIG. 14 depicts the dynamic content generator textual copy configuration screen.

Figure 15:
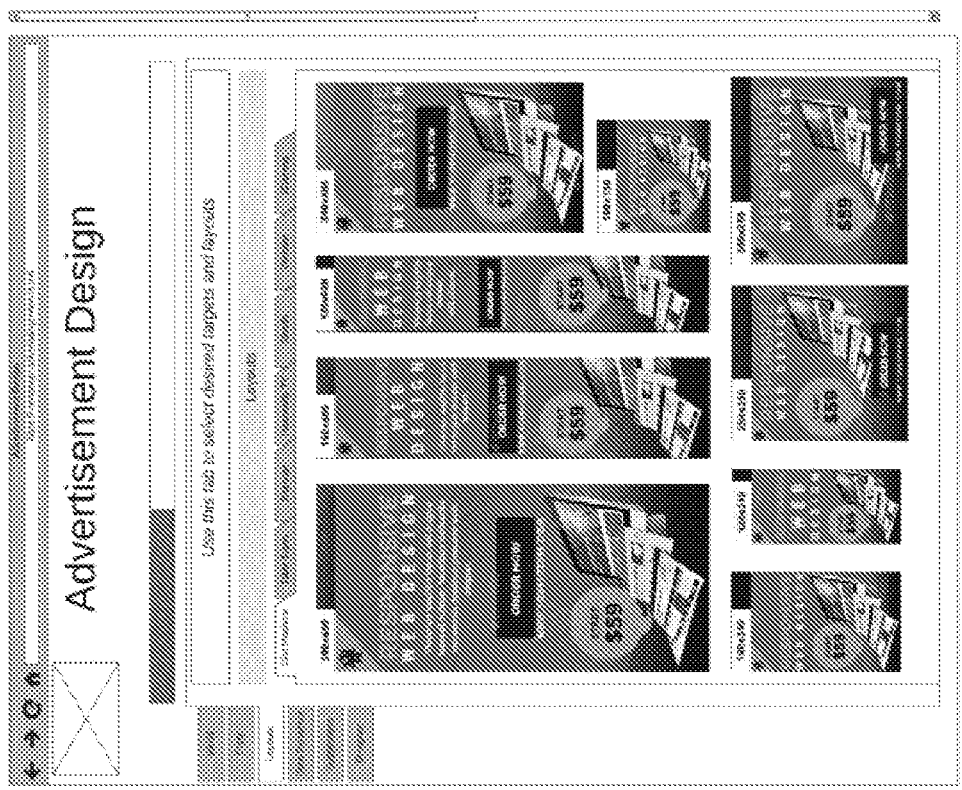
FIG. 15 illustrates a third block diagram of a sub-component of the present system.

FIG. 15 illustrates a third block diagram 1500 of a sub-component of the present system, in accordance with an embodiment of the present subject matter. FIG. 15 depicts the dynamic content generator layout choices configuration screen.

Figure 16:
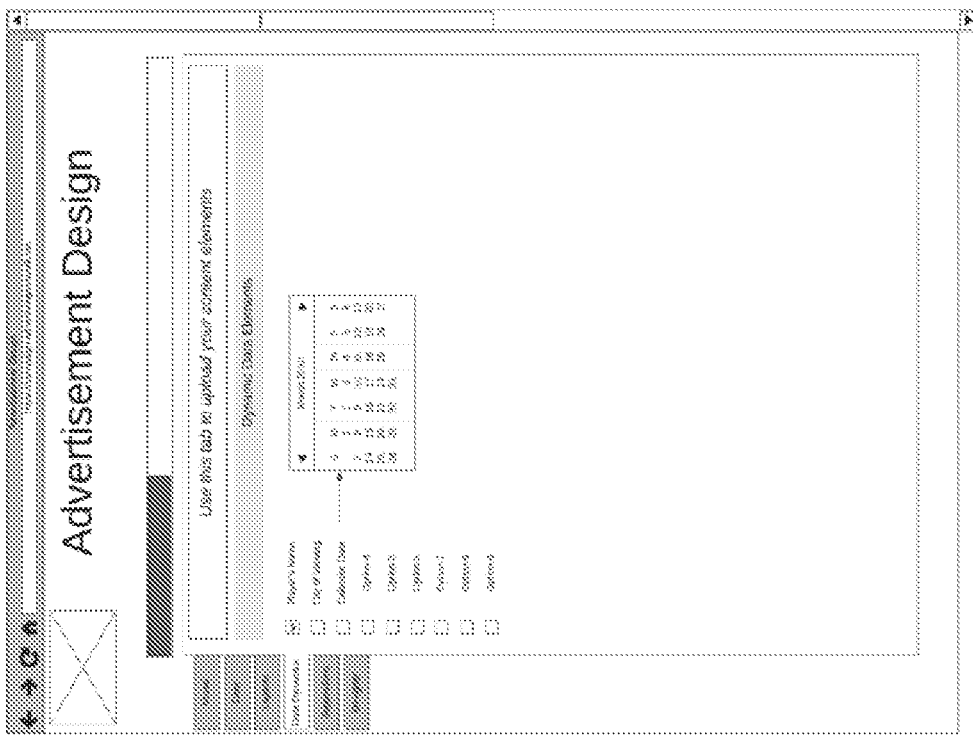
FIG. 16 illustrates a fourth block diagram of a sub-component of the present system.

FIG. 16 illustrates a fourth block diagram 1600 of a sub-component of the present system, in accordance with an embodiment of the present subject matter. FIG. 16 depicts the dynamic content generator data dynamics configuration screen.

Figure 17:
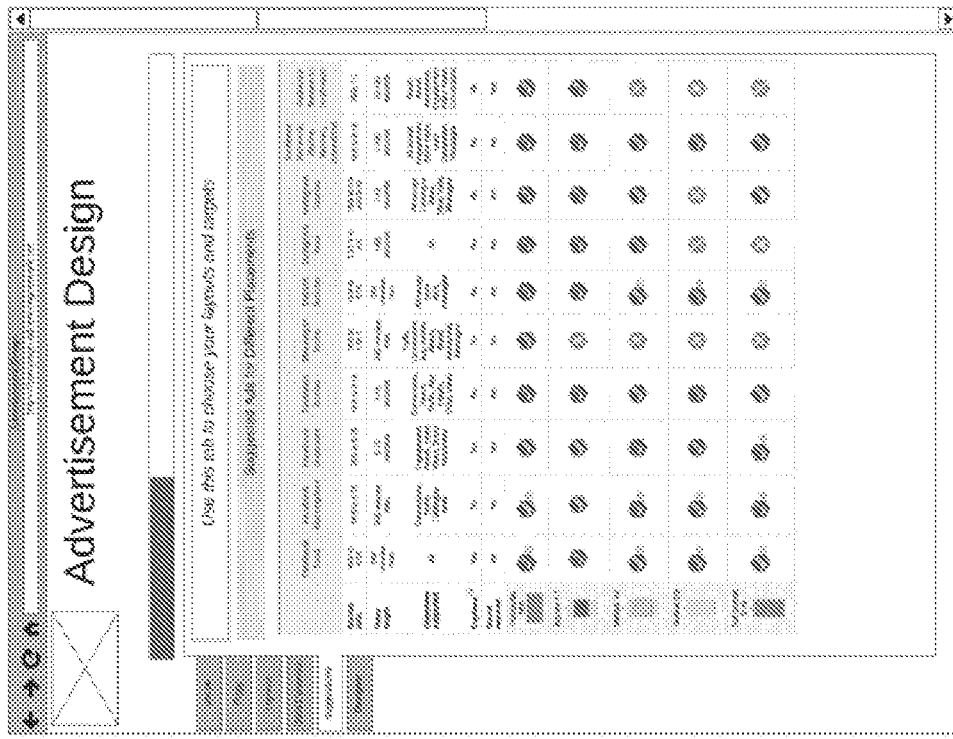
FIG. 17 illustrates a fifth block diagram of a sub-component of the present system.

FIG. 17 illustrates a fifth block diagram 1700 of a sub-component of the present system, in accordance with an embodiment of the present subject matter. FIG. 17 depicts the dynamic content generator suggested dimensions and selection configuration screen.

Figure 18:
FIG. 18 illustrates a sixth block diagram of a sub-component of the present system.

FIG. 18 illustrates a sixth block diagram 1800 of a sub-component of the present system, in accordance with an embodiment of the present subject matter. FIG. 18 depicts the dynamic content generator layout designer configuration screen.

Figure 19:
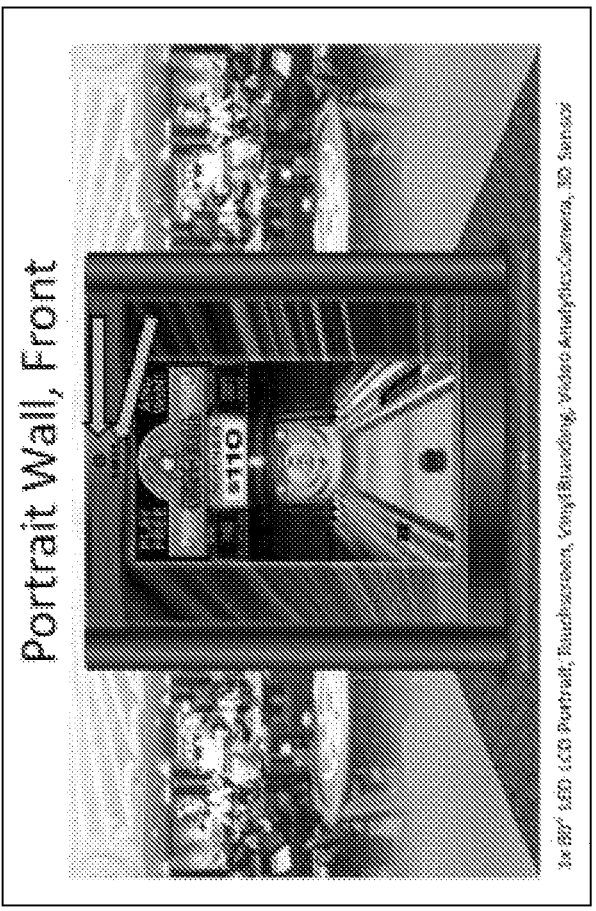
FIG. 19 illustrates a seventh block diagram of a sub-component of the present system.

FIG. 19 illustrates a seventh block diagram 1900 of a sub-component of the present system, in accordance with an embodiment of the present subject matter. FIG. 19 depicts the representation of the front of the promotional game wall in portrait orientation.

Figure 20:
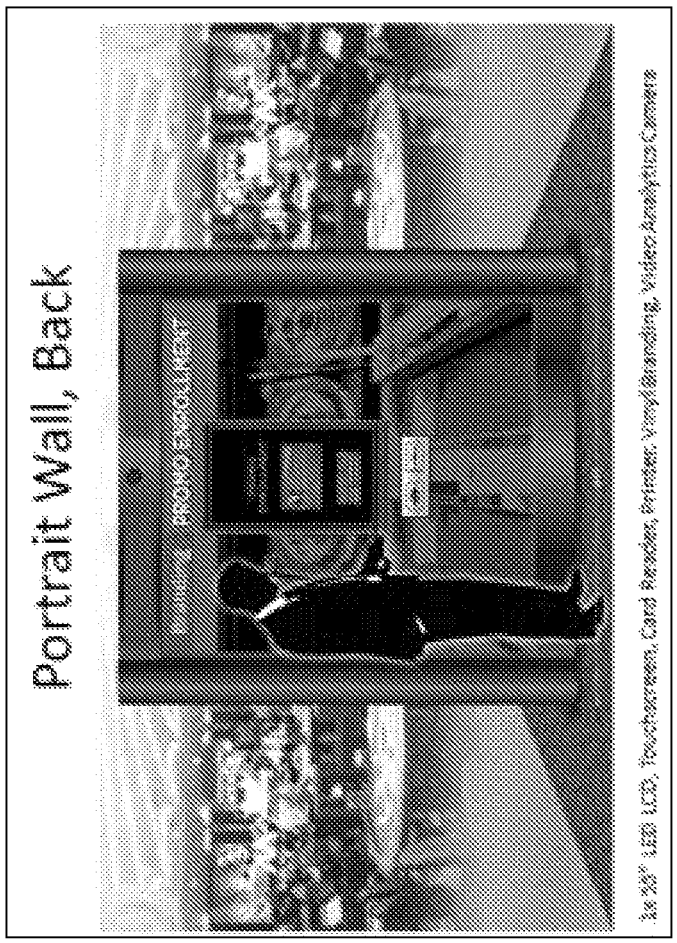
FIG. 20 illustrates an eighth block diagram of a sub-component of the present system.

FIG. 20 illustrates an eighth block diagram 2000 of a sub-component of the present system, in accordance with an embodiment of the present subject matter. FIG. 20 depicts the representation of the back of the promotional game wall in portrait orientation.

Figure 21:
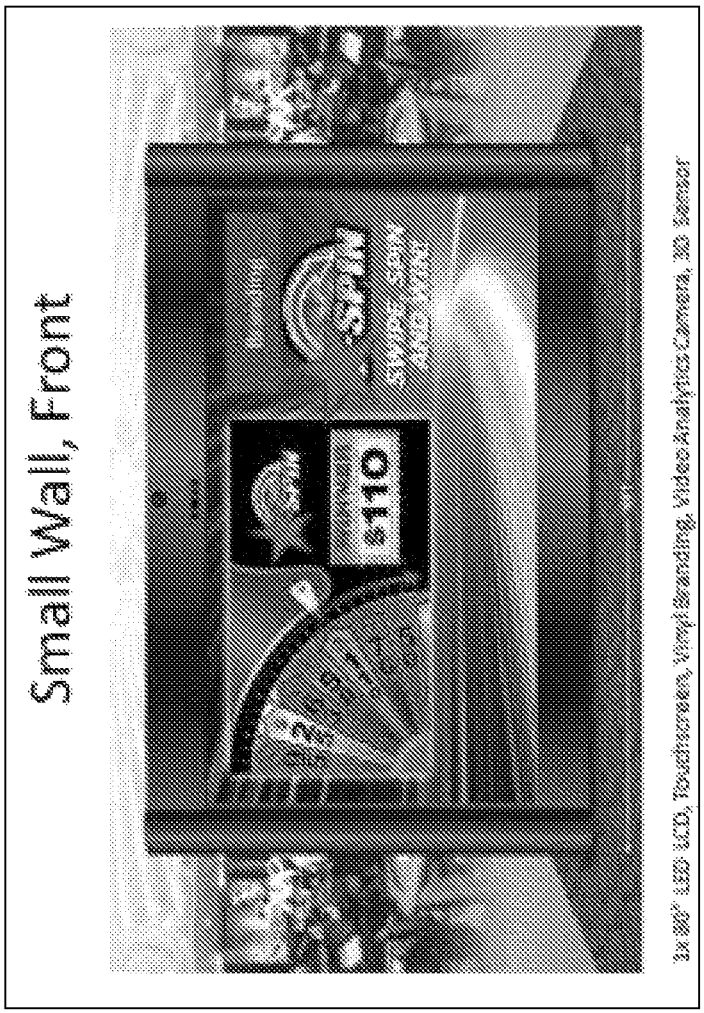
FIG. 21 illustrates a ninth block diagram of a sub-component of the present system.

FIG. 21 illustrates a ninth block diagram 2100 of a sub-component of the present system, in accordance with an embodiment of the present subject matter. FIG. 21 depicts the representation of the front of the small-sized promotional game wall.

Figure 22:
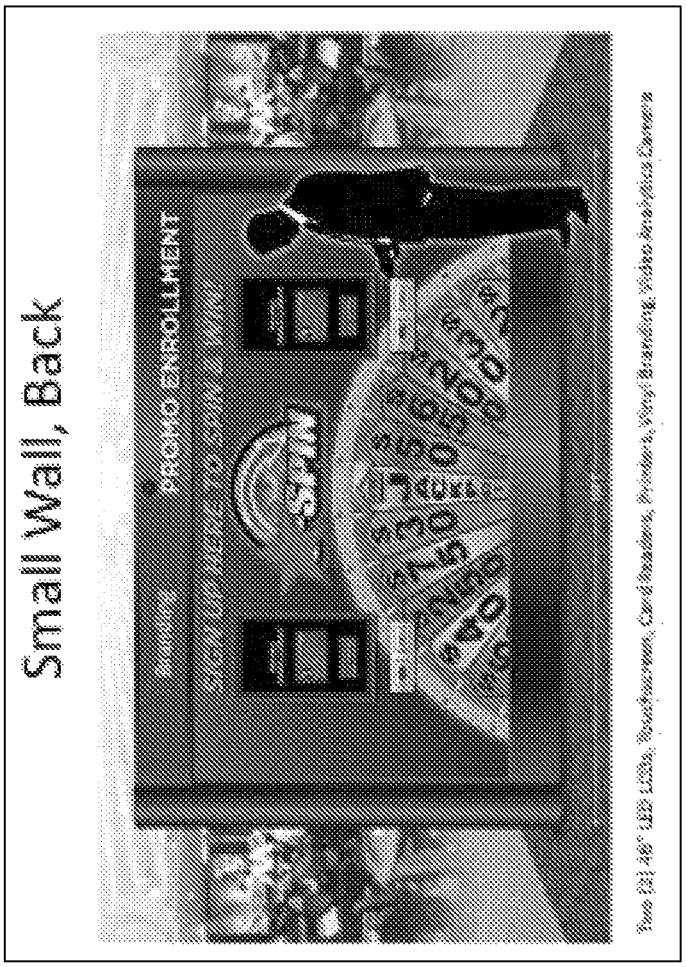
FIG. 22 illustrates a tenth block diagram of a sub-component of the present system.

FIG. 22 illustrates a tenth block diagram 2200 of a sub-component of the present system, in accordance with an embodiment of the present subject matter. FIG. 22 depicts the representation of the back of the small-sized promotional game wall.

Figure 23:
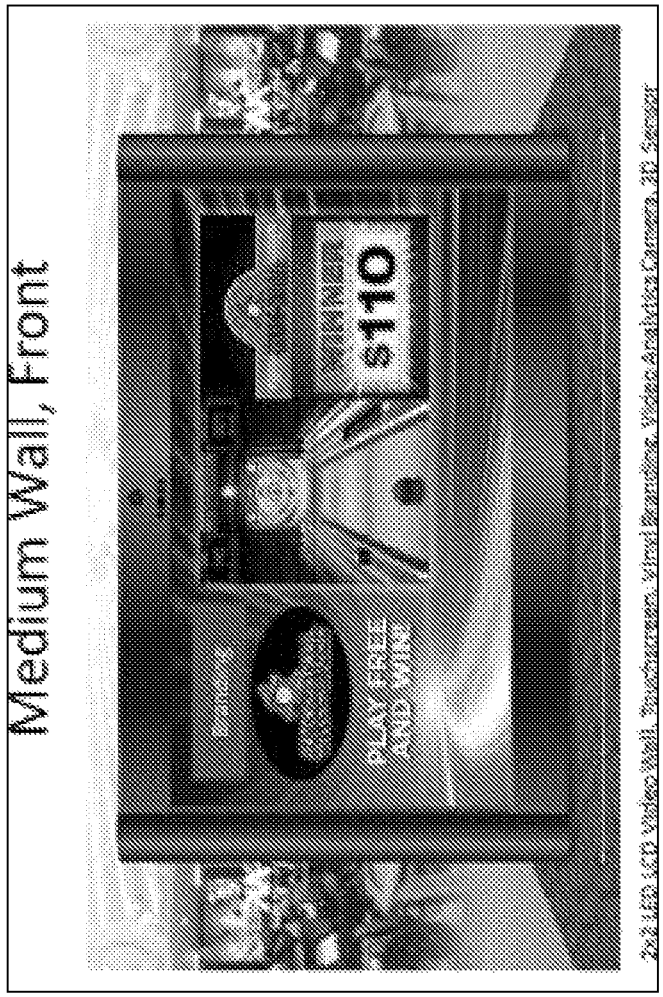
FIG. 23 illustrates an eleventh block diagram of a sub-component of the present system.

FIG. 23 illustrates an eleventh block diagram 2300 of a sub-component of the present system, in accordance with an embodiment of the present subject matter. FIG. 23 depicts the representation of the front of the medium-sized promotional game wall.

Figure 24:
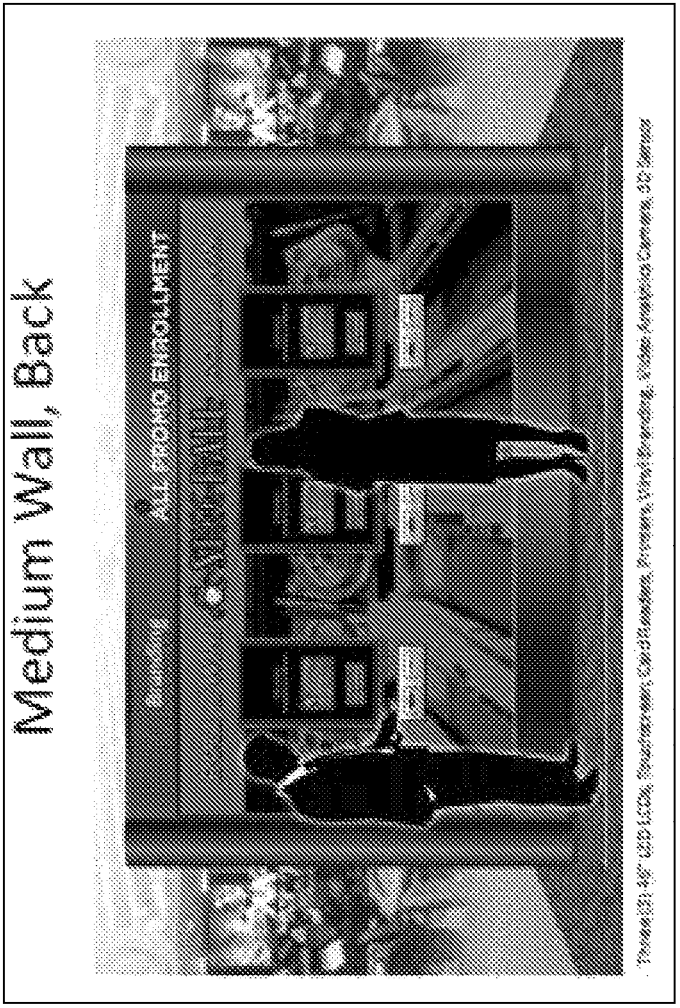
FIG. 24 illustrates a twelfth block diagram of a sub-component of the present system.

FIG. 24 illustrates a twelfth block diagram 2400 of a sub-component of the present system, in accordance with an embodiment of the present subject matter. FIG. 24 depicts the representation of the back of the medium-sized promotional game wall.

Figure 25:
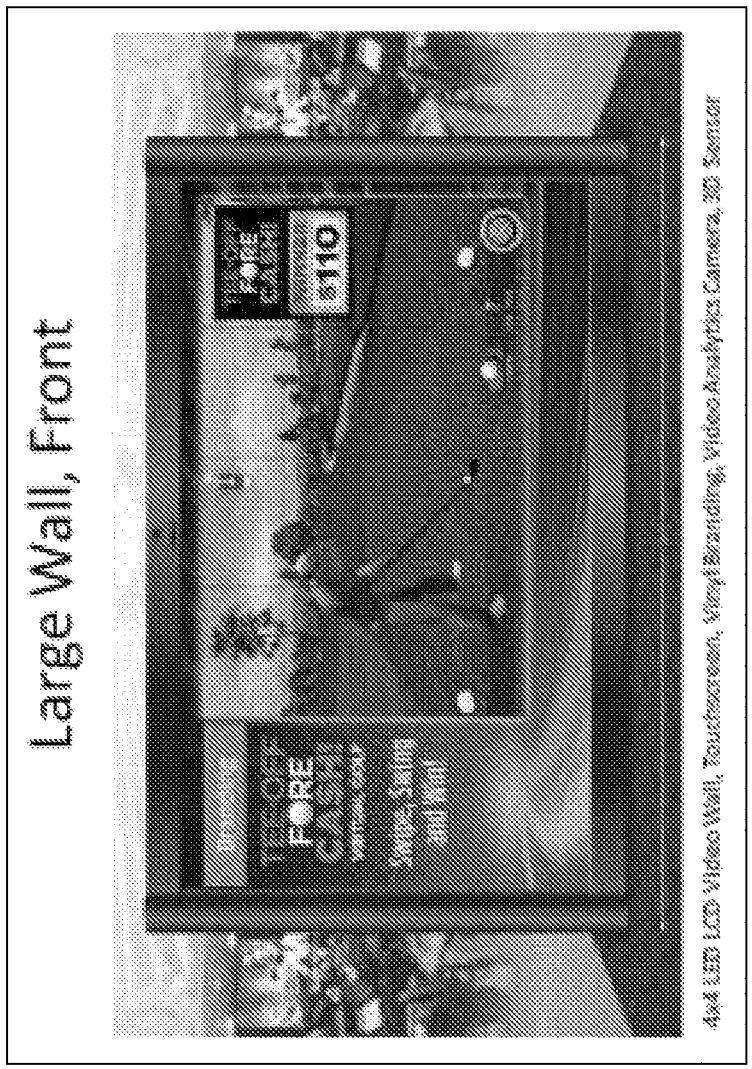
FIG. 25 illustrates a thirteenth block diagram of a sub-component of the present system.

FIG. 25 illustrates a thirteenth block diagram 2500 of a sub-component of the present system, in accordance with an embodiment of the present subject matter. FIG. 25 depicts the representation of the front of the large-sized promotional game wall.

Figure 26:
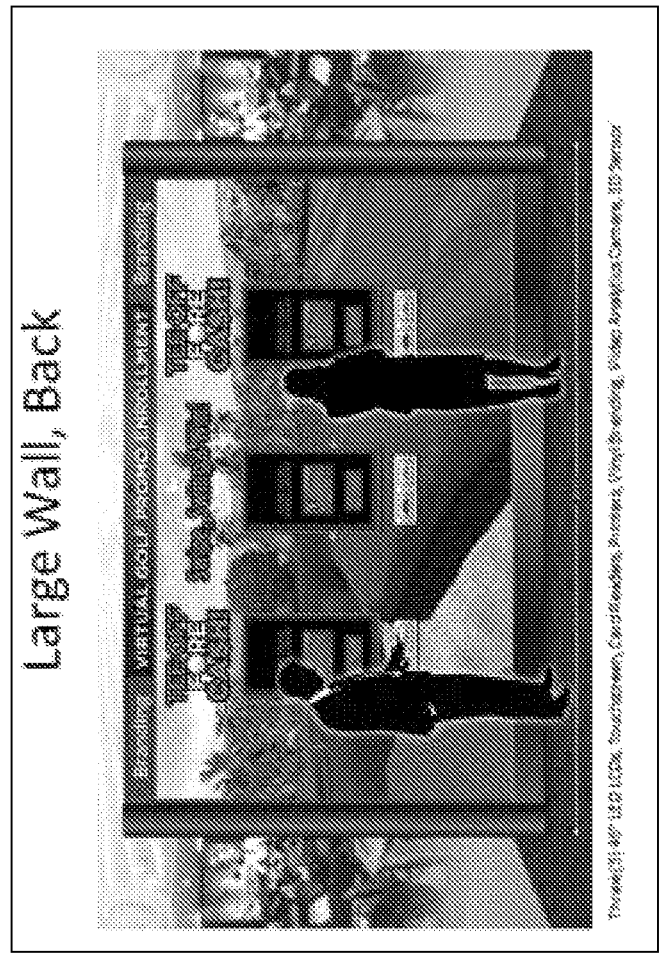
FIG. 26 illustrates a fourteenth block diagram of a sub-component of the present system.

FIG. 26 illustrates a fourteenth block diagram 2600 of a sub-component of the present system, in accordance with an embodiment of the present subject matter. FIG. 26 depicts the representation of the back of the large-sized promotional game wall.

Figure 27:
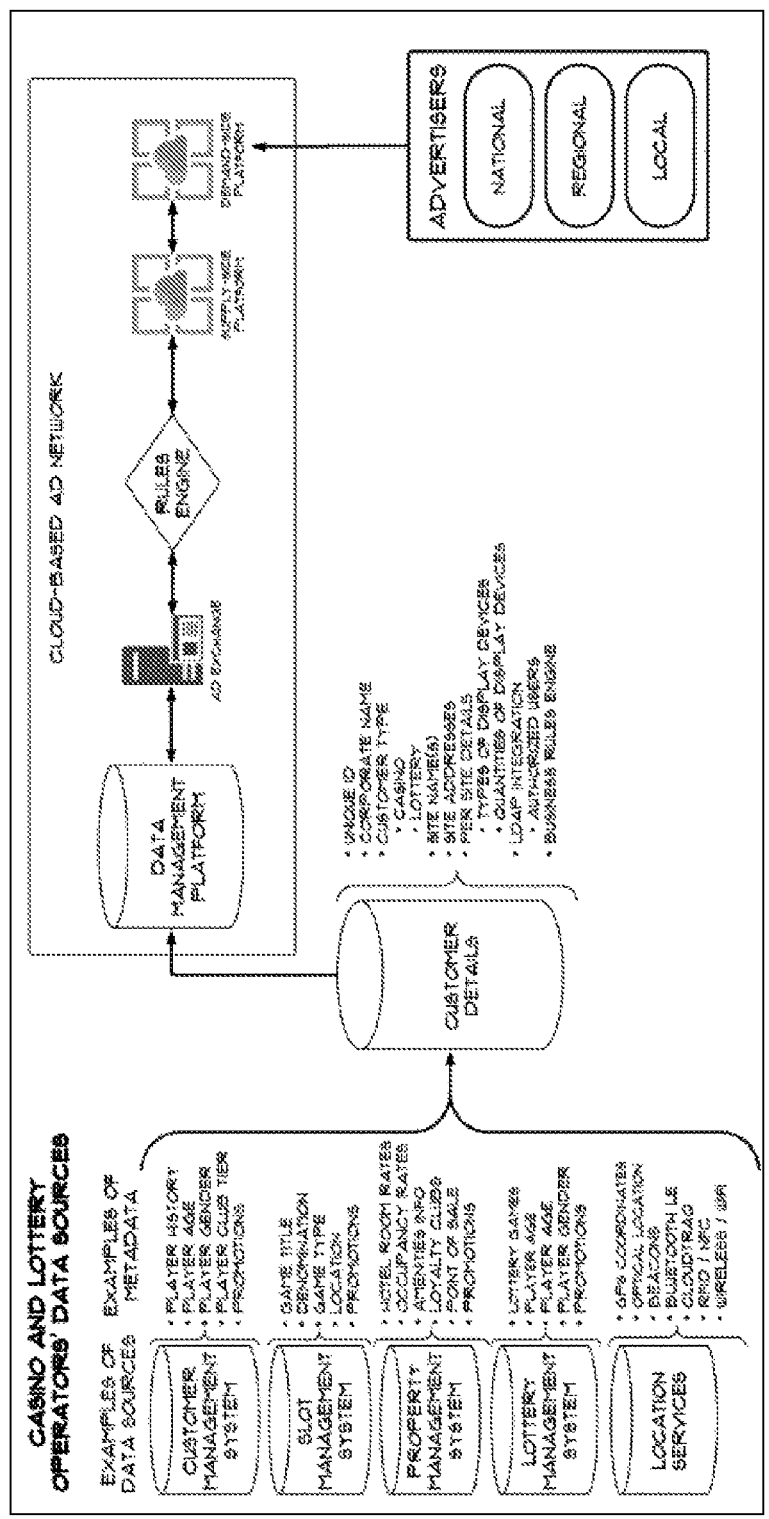
FIG. 27 illustrates a fifteenth block diagram of a sub-component of the present system.

FIG. 27 illustrates a fifteenth block diagram 2700 of a sub-component of the present system, in accordance with an embodiment of the present subject matter. FIG. 27 depicts an overview of the data management platform.

Figure 28:
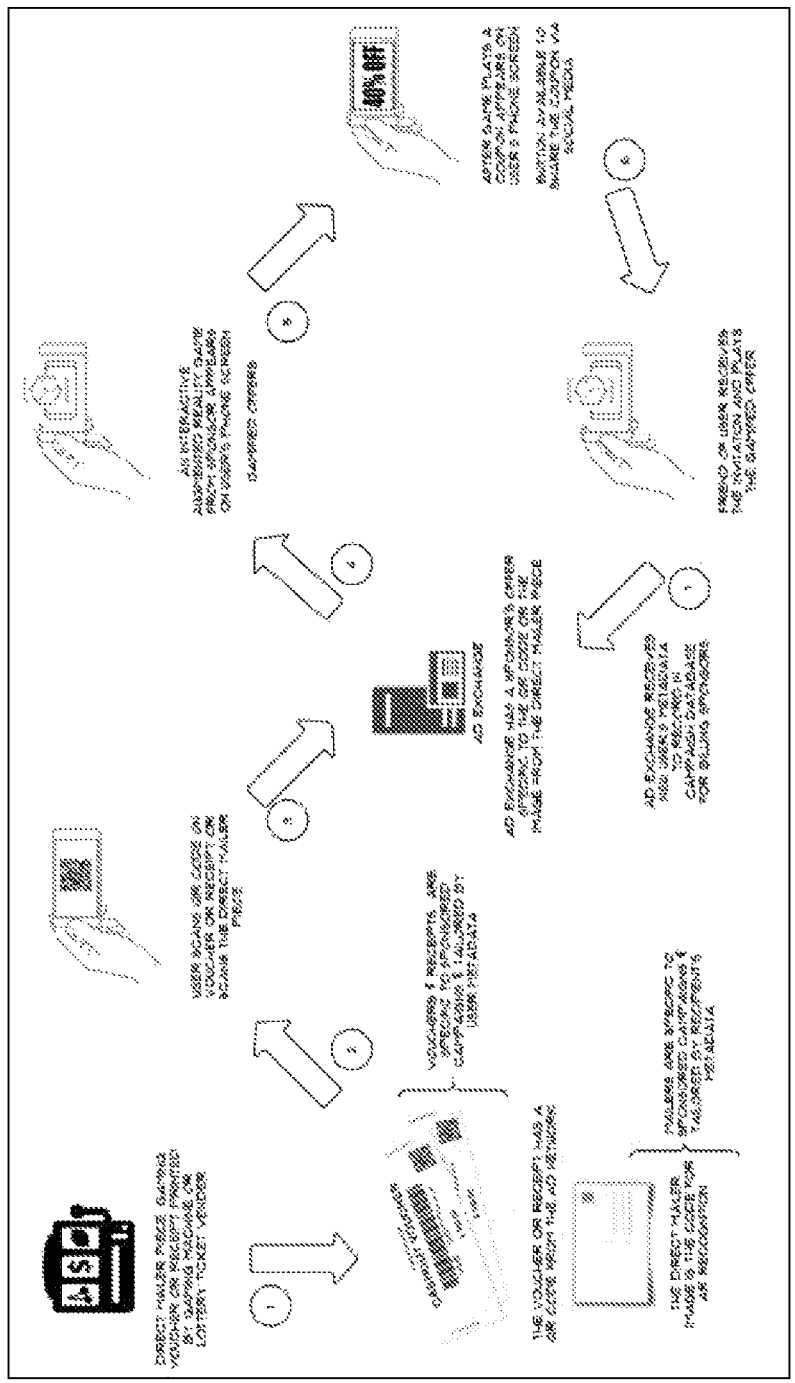
FIG. 28 illustrates a flowchart of a sub-operation of the present system.

FIG. 28 illustrates a flowchart 2800 of a sub-operation of the present system, in accordance with an embodiment of the present subject matter. FIG. 28 depicts the flow of the shareable coupons and mailers utilizing augmented reality and virtual reality.

The present specification further provides an index of elements shown in FIGS. 1-28. 10: Blockchain 11: Distributed Ledger 12: Chaincode Trust Flexibility 13: Scalability 14: Confidentiality 15: Consensus Modularity 16: Token Utility.

20: Supply-side Platform 21: User Interface 22: Analytics And Reporting Database 23: Header Bidding 24: Yield Optimization 25: Inventory Management 26: Integrations 27: Ad Exchange 28: Trackers 29: Backend & Infrastructure. 30: Demand-side Platform 31: User Interface 32: User Profile Database 33: Reporting Database 34: Banker 35: Campaign Tracker 36: Ad Server 37: Bidder 38: Integrations.

40: Artificial Intelligence (AI) And Machine Learning (ML) 41: Audience Targeting 42: Customer-centric Personalization 43: AI-driven Content Curation. 50: Business Intelligence/Search Engine 51: Discovery And Recommendation Service. 60: Advertising Rules Engine Service 61: Advertising Rule Editor 62: Rules Engine Execution Core 63: Advertising Rules Repository 64: Reporting Component 65: User Interface.

70: Shareable, Digital Coupons Utilizing Augmented Reality And/Or Virtual Reality 71: Digital Camera 72: Computer-generated Content 73: Augmented Characters Or Objects. 80: An Interactive, Video Game Wall for Promotional Games 81: A Dual-sided Structure 82: LCD, LED, OLED Or Similar Displays 83: Motion Sensing Input Devices 84: Touchscreen Overlay 85: Receipt Printer 86: Card Reader. 90: Hardware And Software Interfaces 91: Processor 92: Input Devices 93: User Interface 94: Databases.

A blockchain is an immutable, distributed ledger or record of transactions between a network of participants. The entries in the ledger are governed by predefined rules and validated by the network. The network is private with only select participants permitted. It facilitates the buying and selling of digital ad inventory, fraud prevention, whitelisting authorized sellers of inventory, campaign reconciliation, enabling the use of smart contracts to simplify the IO process, validating advertising assets and it's transparency lets advertisers identify exactly who is seeing their advertisements, ensuring they are marketing to real people, not bots.

A blockchain is an immutable, distributed ledger or record of transactions between a network of participants. The entries in the ledger are governed by predefined rules and validated by the network. The network is private with only select participants permitted. It facilitates the buying and selling of digital ad inventory, fraud prevention, whitelisting authorized sellers of inventory, campaign reconciliation, enabling the use of smart contracts to simplify the IO process, validating advertising assets and it's transparency lets advertisers identify exactly who is seeing their advertisements, ensuring they are marketing to real people, not bots.

A Private (Permissioned) blockchain where a central authority (the enterprise or business) is in charge of writing and validating transactions as well as determining who can read the transactions. That same entity decides what the mining rights are and can also override or otherwise modify entries on the blockchain ledger. The private blockchain functions in a closed ledger that uses cryptography to secure it. It is not even possible for all users to have the ability to run a node. Certain activities are meted out as different 'permissions' and only certain participants have these permissions. This type of blockchain is also called permissioned. This is because the central authority grants permission to the users of the network. No one outside of the network can access the blockchain.

Members of the private blockchain network are known to each other but the transaction details are private. Private blockchains offer more efficiency and faster transactions for private enterprises but the security is not as strong as with public blockchains.

Casinos have thousands of latent digital displays on their property with little-to-no means for monetization. Lottery operators have locations where deploying displays simply for digital signage is not cost-efficient. Both casino operators and lottery retailers are missing out on this lucrative, emerging opportunity for generating advertising revenue. iGaming providers, including non-cash social gaming, cash wager gaming, and online sportsbooks are often so focused on their platforms and compliance with regulatory bodies they overlook the additional revenue stream of digital ads. Many of the currently popular mobile applications sell ads as their sole source of revenue. This mass audience of casino patrons is a sizable market highly coveted by advertisers.

The gambling industry has persistent challenges in new player acquisition, active player retention, and reinvestment. The invention will greatly improve the results in the key performance indicators of player acquisition, retention, and reinvestment with advertiser-integrated gamified offers. The invention does this with custom-built, sponsor-driven, tournament bonusing games that casino guests play on electronic gaming machines, video gaming walls, and on their mobile or personal computing devices. The invention will also achieve improved results in player acquisition, retention, and reinvestment with shareable digital coupons that utilize augmented reality or virtual reality to gamify the offers and better engage players.

In some embodiments, a system and method of the invention uses blockchain technology and uses a digital crypto token for payments, exchanges, incentives, and fees in the ecosystem, to provide a complete turnkey service for the gambling industry.

Digital advertising is undergoing a blockchain revolution and the invention employs a completely new native advertising technology stack, which is particularly advantageous for the gaming industry as discussed herein. Embodiments of the invention provide systems and methods for monetizing native advertising applications for the gaming industry. The invention provides tools to Casinos, Lottery, and iGaming Operators that enable seamless interconnectivity to make this value chain attractive and feasible for both the casino publishers and their advertisers.

In some embodiments, the invention comprises a programmatic ecosystem delivered as a Platform-as-a-Service (PaaS) that creates the necessary scale for advertisers and provides the real-time bidding engine for casinos to 'sell' their digital ad space. Some embodiments of the invention also provide a real-time advertising rules engine to enable Casino, Lottery, and iGaming Operators to filter permissible ads for their properties and provides offer presentment and redemption via international intermediaries.

Some embodiments of the invention utilize a private, permissioned blockchain for immutable smart contracts and digital tokens for all payments, exchanges, incentives, and fees in the ecosystem. The invention is thus configured to be able to provide a turn-key, cloud-based service for the easiest implementation with the least impact upon Casino, Lottery, and iGaming operations.

By utilizing embodiments of the invention, publishers have instant access to all high-quality advertiser demand with low-cost barriers to participation. Publishers benefit from, among other things, instant payment settlements on blockchain and transparent advertising demand within the ecosystem. Through embodiments of the invention Advertisers incentivize Users to act using compensation mechanics and can offer variated compensation schemes for clicks, lead generation, mobile application installations, completed ad video views, sharing posts within social networks, and other actions.

The invention's advantageous use of blockchain technology provides for security and traceability of all transactions. Every party involved in an ad interaction has access to all relevant information about other parties involved in that interaction and their associated expenses. Advertiser stakeholders will be able to verify directly how advertising budgets are spent and perform in-depth audits of third parties as needed. Advertisers are protected from non-human, bot-fraud traffic thereby ensuring the safety of their brand exposures. By tamper-proof, secure storage of all smart contracts and event logs inside a blockchain, it is impossible to use corruption schemes in digital ad buying.

With an ecosystem built on blockchain, machine learning, and artificial intelligence, and access to myriad sources of data the invention has a truly remarkable ability to offer analytics services with deep consumer insights.

In some embodiments, the present system and method are internet cloud-based and cloud-hosted digital advertising and marketing platforms that include: 1. A private, permissioned blockchain, 2. A supply-side platform (SSP), 3. A demand-side platform (DSP), 4. A real-time ad bidding engine, 5. A publisher-specific advertising rules engine service, 6. An analytics engine, 7. Social affinity interfaces, 8. Sponsor-driven promotional games for gamified offers, 9. A casino bonusing system interface, 10. A random number generator (RNG), 11. A location-services interface, 12. A dynamic content creative generator, 13. A consumer behavior and profile modeling service, 14. Biometrics interface, 15. A casino systems interface, 16. A lottery operation systems interface, 17. Content proxies, 18. Shareable, augmented reality and virtual reality enabled digital coupons, 19. Intelligent offering services, 20. Artificial intelligence with machine learning services, 21. An Internet-of-Things (IoT) hub with monitoring and deployment services, 22. Blob storage (handles trillions of stored objects, with millions of average requests per second, for customers around the world), 23. Business intelligence, 24. Cognitive search engine, 25. Self-service tools, 26. A viewer profile generator service.

The invention's AdTech infrastructure: The invention's infrastructure includes all components required to establish a complete digital advertising cycle within the ecosystem and to create gateways with traditional, existing AdTech systems, and gaming operation systems.

1. An Internet Cloud-based Platform: The invention is an internet cloud-based and cloud-hosted, digital advertising and marketing platform as an Infrastructure-as-a-Service (IaaS) provider. Some of the benefits provided by an IaaS are:

2. World-Class Security: The same security technology that supports private global networks protects the invention data while meeting rigorous industry-specific compliance standards.

3. Layered infrastructure: Progressive layers deliver multi-tiered security, detecting and responding to internal and external threats, 24/7.

4. Cloud IoT Core: Internet of Things (IoT) Cores are managed services for securely connecting and managing IoT devices, from a few to millions. The invention can ingest data from connected devices and build rich applications that integrate with the other big data services of the Cloud Platform. The invention uses this with the devices under banks of slot machines and lottery vending locations and elsewhere. These devices process the Blockchain State Channels and some of the data analytics.

5. Intelligent Monitoring and Control: The invention gains real-time visibility into who is accessing data and reduces risk by ensuring that only the right users can do so.

6. Privacy and Transparency: The invention always knows where the data is stored and easily monitors and controls how it is being used.

7. AI and Data Analytics: The Cloud Platform would have artificial intelligence and machine learning capabilities embedded in their core solutions and infrastructure, making them accessible and easily deployed across the enterprise.

8. Big Data Analytics: The invention can more quickly turn data into actionable insights with a server-less data analytics and machine learning platform that surpasses conventional limitations of scale, performance, and cost-efficiency.

9. Business Intelligence/Search Engine: The invention easily scales business intelligence with data integration, transformation, analysis, visualization and reporting tools provided by the Cloud Platform and their technology partners.

10. Kubernetes Engine (KE): Kubernetes is an enterprise-grade platform for containerized applications, including stateful and stateless, AI and ML, Linux and Windows, complex and simple web apps, API, and backend services. With Kubernetes, the invention can leverage industry-first features like multi-way auto-scaling and no stress management, optimize GPU and TPU provisioning, use integrated developer tools and get multi-cluster support from Cloud Platform Engineers.

11. Pod and Cluster Autoscaling: Pod autoscaling based on CPU utilization or custom metrics, cluster autoscaling that works on a per node-pool basis, and vertical pod autoscaling that continuously analyzes the CPU and memory usage of pods and dynamically adjusts their CPU and memory requests in response. With Cloud Platforms the invention automatically scales the node pool and clusters across multiple node-pools, based on changing workload requirements. Kubernetes enables rapid application development and iteration by making it easy to deploy, update, and manage applications and services.

12. Continuous Delivery Pipeline: Continuous delivery pipeline using Kubernetes, Cloud Source Repositories, and Cloud Build. The invention configures these services to automatically build, test, and deploy applications. When the app code is modified, the changes trigger the continuous delivery pipeline to automatically rebuild, retest, and redeploy the new version.

13. A Private, Permissioned Blockchain: A blockchain is an immutable, distributed ledger or record of transactions between a network of participants. The entries in the ledger are governed by predefined rules and validated by the network. The network is private with only select participants permitted. It facilitates the buying and selling of digital ad inventory, fraud prevention, whitelisting authorized sellers of inventory, campaign reconciliation, enabling the use of smart contracts to simplify the IO process, validating advertising assets and it's transparency lets advertisers identify exactly who is seeing their advertisements, ensuring they are marketing to real people, not bots. The invention will operate on a private and permissioned blockchain where the Network Operator is the central authority in charge of writing and validating transactions as well as determining who can read the transactions. The Network Operator also decides what the mining rights are and can also override or otherwise modify entries on the blockchain ledger. The private blockchain functions in a closed ledger that uses cryptography to secure it. It is not even possible for all users to have the ability to run a node. Certain activities are meted out as different 'permissions' and only certain participants have these permissions. This type of blockchain is also called permissioned. This is because the central authority grants permission to the users of the network. No one outside of the network can access the blockchain. Members of the private blockchain network are known to each other but the transaction details are private. Private blockchains offer more efficiency and faster transactions for private enterprises.

14. A Supply-Side Platform with a bidding engine: A Supply-Side Platform (SSP) is a piece of software used by digital publishers to help them sell advertising in an automated fashion. SSPs allow publishers to connect their inventory to multiple ad exchanges, Demand-Side Platforms (DSP), and networks at once allowing a huge range of potential buyers to purchase ad space and for publishers to get the highest possible rates. For the invention's SSP to provide its features to publishers and sell ad space, the various integrated backend components are hosted in the Cloud-based infrastructure. From there, the invention can carry out all the various technical processes that power the invention's SSP features. The invention's SSP integrates with other invention AdTech platforms and third-party AdTech platforms to facilitate the selling of inventory (for example with ad servers, DSPs, and ad exchanges) and with the invention's Data-Management Platform (DMP) to maximize revenue. An ad exchange orchestrates the buying and selling of ads between advertisers and publishers. Since the invention's SSP incorporates ad-exchange functionalities publishers can directly connect to advertisers via the invention's DSP, rather than having to first connect to external ad exchanges. Trackers collect data about the publisher's digital displays and audience. This data is then sent to other components such as the user-profile database and reporting database. The Analytics and Reporting database receives campaign and audience data from the tracker, which allows publishers to generate reports and view campaign analytics. The user interface is the screen that publishers use to manage campaigns, view reports, view billing, and use other features of the SSP. Once data has been sent from the reporting database publishers can create and view reports about the performance of their inventory, including fill rates, clicks, and impressions.

The invention's SSP incorporates header-bidding functionality allowing publishers to obtain bids from multiple demand sources (e.g. DSPs) before the ad server is called. The header bidding feature of the invention's SSP enables publishers to manage their various header-bidding wrappers and demand partners. The yield optimization feature of the invention's SSP aims to increase revenue for publishers by improving fill rates, setting floor prices and managing auction mechanics (e.g. first- and second-price auctions). The inventory management and campaign management features allow publishers to manage different types of inventory (display, video, native, etc.), blacklist and whitelist advertisers, set IAB categories, and block certain types of ads. The invention's SSP helps publishers manage the complexity and volatility of the programmatic ad buying process, especially when managing multiple ad networks and their diverse requirements and limitations.

There are several processes and requirements the invention's SSP may automatically handle, including 1. Real-time bidding transactions: the invention's SSP sells a publisher's inventory to the DSPs via the ad exchange. 2. Ad-network optimization: Although a publisher may have a variety of ad networks ready to buy the inventory, each network may have slightly different requirements. One network will pay a $2.00 CPM but only fill 20% of the time, another network will pay $1.00 CPM and fill 70% of the time, and another network will only pay $0.50 but fill 100% of the time. Based on this historic information, the invention's SSP will determine which ad network to connect to when impressions become available on a publisher's digital assets. 3. Frequency capping: the invention's SSP and DSPs often sync and match cookies to run frequency capping, which is the process of recording the number of times a specific visitor is shown a particular advertisement and then limiting the number of times that visitor sees that ad. This restriction is applied to all digital displays that serve ads from a campaign in a DSP.

Some ad networks accept impressions from select geographies. The invention's SSP allows the publisher to ensure that only relevant ad networks are considered in the process. Managing ad networks' varying levels of latency and other discrepancies: the invention's SSP platform automatically selects ad networks that consistently offer the best level of latency, which improves the overall real-time bidding process.

The invention's SSP shall take care of the above variables by using advanced algorithms and predict which network will provide the highest effective yield at a given time. The invention's SSP also will streamline the ad-buying and displaying process. It limits latency, increases yield, and takes a huge burden off ad-operations teams.

Here's a brief overview of how publishers would use the invention's SSP to sell their inventory during RTB: 1. A publisher makes its ad inventory available on the invention's SSP. 2. Each time the publisher's digital display loads, an ad request is sent to the invention's SSP via the publisher's ad server. 3. In the case of RTB media buys the DSPs place bids on the impression being offered by the publisher. 4. The winning bid is then delivered to the digital display via the invention's SSP and displayed to the visitor.

The invention's SSP interfaces with publishers and offers several benefits: 1. Automated selling of inventory: Publishers can sell all their inventory to advertisers, including display, video, and native ad space on any networked digital device. The invention's SSP helps streamline the process of selling and buying inventory by completely removing manual work from the process. Machines handle every transaction so publishers of all sizes can use the invention's SSP to monetize their digital displays. 2. Reporting: The invention's SSP gives publishers details on who is bidding, how much their inventory is being bought for, and how much individual advertisers are buying. This offers deeper insights into the value of their inventory for advertisers. 3. Aggregation of multiple networks: The invention's SSP helps combat the problem of driving the value of inventory down if there are not enough bidders coming from a single ad network or ad exchange. By connecting to multiple networks, ad exchanges, and DSPs the invention's SSP allows more buyers to take part in the real-time bidding process and achieve a better yield. 4. Yield optimization with price floors: The invention's SSP not only allows publishers to offer their inventory to more buyers but it also gives them better control of pricing. "Price floors" ensure that their inventory is not sold below a certain price point. 5. Brand safety: By acting as an intermediary, the invention's SSP offers better brand safety for publishers by blocking unwanted ads from showing on digital assets. This could be done by "blacklisting" certain IAB categories, advertiser domains or selected creatives as defined in the invention's Advertising Rules Engine Service (ARES). The invention's SSP could be set, for example, to only offer inventory to specific buyers or through specific channels. Some publishers would rather run in-house ads than show an inappropriate ad.

15. A Demand-Side Platform: A Demand-Side Platform (DSP) is a piece of software used to purchase advertising in an automated fashion. DSPs are most often used by advertisers and agencies to help them buy display, video, mobile, and search ad impressions across a range of publisher sites but targeted to specific users based on information such as their location and their previous behavior.

The invention's DSP allows advertisers to buy impressions across a range of publishers targeting specific users based on information such as their location and their previous gaming behavior. Publishers make their ad impressions available through the ad exchange and the invention's DSP automatically decides which of those impressions makes the most sense for an advertiser to buy. The price of those impressions is determined by a real-time auction, through a process known as real-time bidding.

The invention's DSP provides an ability to buy, serve, and track ads using one central tool, optimizing ad campaigns more easily as a result. The invention's DSP needs to connect to inventory supply sources, such as the invention's supply-side platform (SSP) and the ad exchange. Also, the invention's DSP integrates with the invention's data management platform (DMP) to improve ad targeting, as well as ad verification and creative optimization platforms. For the invention's DSP to work, it needs to connect to various supply sources, such as supply-side platforms (SSPs) and ad exchanges and integrate with the invention's data-management platform (DMP) to improve ad targeting, ad verification, and creative optimization platforms.

A bidder is the component of a DSP responsible for placing bids on inventory during real-time bidding (RTB) auctions.

Typically, a DSP will have multiple bidders located in different data centers to ensure they can receive and respond to bids within the required time frame (typically under 200 ms) from SSPs and ad exchanges, which are also located in the same data center.

The bidders contain the cached version of an advertiser's campaign targeting criteria to reduce latency when bidding, allowing the bidder to respond to bid requests quicker.

The invention has an ad server that plays two key roles in the invention's DSP. First, it's responsible for storing ad creatives and the ad markup. Second, it is the component that displays the ad to the user.

Campaign trackers collect data about the performance of the campaign, such as impressions, clicks, win notifications, etc. This data is then passed to the invention's reporting database.

The invention's DSP has a banker module that acts as a cashier or campaign-spending control and is responsible for avoiding campaign overspending.

The invention's reporting database stores data collected by the campaign tracker and generates aggregated reports which are then sent to and displayed on the user interface.

The invention's user profile database stores data about the users, such as which ads they viewed and segments they belong to. This data is then used for things like frequency capping and retargeting.

The invention's user interface is the screen that advertisers use to create and manage their campaigns—such as setting up targeting, frequency capping, placement, etc.—as well as view reports about the campaign's performance and budget.

16. A Data Management Platform: A data management platform (DMP) is a piece of software that collects, stores and organizes data collected from a range of sources, such as the Publisher's websites, mobile apps, electronic gaming machines, slot accounting systems, player management systems, table game management systems, financial kiosks, loyalty kiosks, property/lodging management systems, point of sale systems, and advertising campaigns. The invention's DMP is used by advertisers, agencies, and publishers to improve ad targeting, conduct advanced analytics, look-alike modeling, and audience extension. Most consumers have visited a website to look at a product and then noticed ads for that product on every subsequent digital channel they used over the next few days. These ads keep brands top of mind and hopefully drive people back to make a purchase. The technology which brands use to drive those follow-up ads and ensure they appeal to a customer is a marketing data management platform (DMP). The invention's DMP pulls data from in-house systems and third parties and uses that data to build detailed customer profiles that drive targeted advertising and personalization initiatives. The invention's DMP data collector gathers data from a range of sources, organizes it, and shares it with other systems and services of the invention. For internal data, the DMP might pull from the Casino, Lottery, or iGaming Operator's CRM software or their other channels like websites or email. For external data, the invention's DMP may connect to third-party data brokers or corporate partners. Once the invention's DMP has gathered the data the profile builder organizes it to build a profile of each customer (the data in the invention's DMP is anonymized). Advertisers or in-house marketing staff will define rules for when that profile visits a website, sits at a slot machine, visits a lottery ticket vending machine, opens the mobile game app, or checks into their resort room. Advertisers or in-house marketing staff will also link "look-alike" profiles that share attributes—such as all men in Florida over 50 who use an iPhone—into an audience so that all members receive the same marketing messages or offers.

The invention's DMP then shares information on audiences and profiles with the invention's other AdTech platforms so those platforms know who to serve which ads or content. The invention's DMP then collects information on ad performance to analyze and improve future ad purchases.

By gathering, organizing, and sharing this data the invention's DMP enables advertisers and in-house marketing staff to design targeted ad campaigns, extend their reach beyond known customers to look-alike prospects, and drive more personalized interactions across channels. The benefits accrue in the form of more customer purchases and more efficient ad programs.

To illustrate how this could work in practice, consider Big Sky Spirits, a fictitious producer of beer, wine, and spirits that are launching a new vodka brand and wants to engage men between 30 and 40 who live in suburban locations and like distilled spirits. Big Sky Spirits is a registered advertiser in the invention's Network and is focusing a campaign to run at Casino Agave, a resort casino registered as a publisher in the invention's Network. When loyal Casino Agave customer Terry visits the resort and sits at the slot machine with the invention's beverage ordering application and Terry invokes the app to order his usual drink, a whiskey. The invention recognizes Terry from his Player Card inserted into the slot machine and receives Terry's info from Casino Agave's CRM system and shows a display ad for Big Sky's new vodka and suggestion to order that drink for this time. Terry accepts the Call to Action and the drink order is placed and fulfilled.

Later, when Terry again opens the beverage ordering application on another slot machine, the invention's ad exchange connects Terry's profile to the information shared by the invention's DMP and shows another offer for the Big Sky vodka drink. A day later, when Terry launches a Casino Agave mobile app to play the tournament bonusing game, he sees a new Big Sky ad interstitial as the app opens, this ad is a shareable, digital coupon offer Terry can redeem for a 750 ml bottle of the new vodka he previously tried at Casino Agave. Motivated, he goes into a local retailer and redeems his vodka bottle offer. The invention's DMP receives notice from the coupon redemption processor that the digital coupon was redeemed and that activity and relation to the campaign are recorded in the invention's DMP and assessed for future campaigns.

At the same time, across the casino, spirit drinkers in their 30s to 40s like Terry his "look-alikes"—are seeing ads for the Big Sky vodka. Some of them eventually click through to order the vodka and receive the shareable, digital coupon offer where the brand can individually engage with them.

In this mock scenario, the brand moves Terry from an exploratory taste test to a reorder and ultimately to a retail sale. Casino Agave created more value for their guest and Big Sky acquired a new prospect to its brand, all with the help of the invention's DMP.

17. A Dynamic Content Creative Generator: A software that compiles media assets from advertisers into content that automatically matches the targeted display size and dimensions.

The Dynamic Content Creative Generator takes content and creative assets as individual objects and lets them be added into layout templates based upon the condition of the advertisement being displayed. The Generator eliminates the need to build creative for every specific playout touchpoint. Rather the media rendering engine allows for templates to build content on-demand and reduce costs in building out creatives.

18. An Advertising Rules Engine Service: The invention's Advertising Rules Engine Service (ARES) is a software application allowing non-programmers to change the business logic in the invention's SSP or the invention's DSP. To carry out a business policy or procedure, a business rule or statement is required. Business logic uses data in a database and a sequence of operations to carry out the business rule. Execution code for business rules is separated from the invention's SSP/DSP system, allowing the end-user to change business rules without asking for a programmer's help. The invention's Advertising Rules Engine Service evaluates the changes' effects on other rules and flags the user if there is a conflict.

The invention's ARES includes • An Advertising Rule Editor: This is an intuitive interface allowing business users to design, define, document, and edit advertising rules. • The Rules Engine Execution Core: This is a programming code enforcing the rules. • The Advertising Rules Repository: • This is a database storing business rules, which are defined by SSP or DSP users. The Reporting Component: This is an intuitive interface allowing business users to query and report existing rules.

19. Search-based Business Analytics Engine: The invention's business search and AI-driven analytics engine make it easy to find important information in complex data. Everyday decisions require uncommon insight which demands the discovery of new facts and connections. Summaries, exploration, and guidance foster discoveries in daily decision-making. The invention's AI-driven analytics engine is specifically built to navigate, explore, and guide users through multiple data sources as never before. Gone are the days of searching through data by keyword guessing. The invention's approach allows users to start with a theme, narrow to a category of interest, and drill into an unlimited number of related attributes in the data.

20. Social Affinity Service: The invention provides for a real-time, privacy-safe Identity Resolution & Enrichment service to build trust between people and brands. The goal of this service is to provide a highly tailored customer journey. The invention's approach delivers a more complete unified representation of each real individual. This fosters relationship-building and is the foundation of a successful brand.

The invention integrates a wide range of attributes to give a single, more complete, and accurate view of each individual for engagement. The invention appends contacts with social, demographic, psychographic, affinity, and interest data. Previous research has suggested that people who are in the same social circle exhibit similar behaviors and tastes. The rise of social networks gives insights into the social circles of web users, and recommendation services (including search engines, advertisement engines, and collaborative filtering engines) motivate to adapt recommendations to the interests of the audience. An important primitive for supporting these applications is the ability to quantify how connected two users are in a social network. The shortest-path distance between a pair of users is an obvious candidate measure.

21. Sponsor-driven Promotional Games for Gamified Offers: Gamification is the application of game mechanics into non-game activities and processes to prompt specific behaviors. It uses proven techniques from game design to engage end-users with publisher and advertiser content, communities, or brands, while simultaneously driving meaningful value for their businesses. It is a means for engaging, influencing, and motivating diverse groups of people. Gamification of offers is the process of integrating game mechanics and dynamics into the advertising service or marketing campaign to drive participation and engagement by target audiences to more deeply engage with consumers, employees, partners, and other audiences, and inspire them to participate, collaborate, share, and interact in some activity or community.

Gamification is a process where the essence of what makes games so "fascinating and irresistible" is integrated into non-game experiences. When doing this, elements like rewards, challenges, and more are added to websites or mobile apps. These trigger a sense of achievement and make use of the competitive nature in people, encouraging them to use the app/website even more, because they'll enjoy it.

Using gamification ensures long-term engagement, loyalty, and valuable results for gaming businesses. Game elements that can be added are points, leaderboards, ratings, virtual currency, virtual elements, and much more.

Casino, Lottery or iGaming Operators can gamify marketing offers specific to their property assets like meals at restaurants, tickets to entertainment venues, or additional or bonus play opportunities. Alternatively, sponsors from the invention's Network can sponsor the gamified prizes to get additional exposure which often results in greater prize values and thus more virality of the marketing campaign, more customer stimulation, and longer customer engagements.

The invention's Network provides Casinos, Lottery, and iGaming Operators with gamified content for turnkey marketing campaigns. The invention's Network, through a specific class of advertisement contracts, can also secure third-party sponsors for Casinos, Lottery, and iGaming Operators to leverage for more engaging campaigns.

In some embodiments, the invention's bonusing games are custom developed games built upon an industry-standard gaming engine. The games are available in HTML codebase so they are portable to virtually any device with a web browser such as Service Window devices installed in casino slot machines like the Bally iVIEW®, the IGT Universal Game Adaptor®, the Aristocrat Oasis nCompass™ Media Window, and the Konami True Time Display & Windowing™, or any modern mobile device like Smartphones or tablets, on IPTV set-top boxes, loyalty kiosks, and personal computing devices. They integrate with common casino bonusing servers to drive the outcomes or use the invention's bonusing game engine with Random Number Generation for dynamic and random winner results.

The games can be skinned for the operator's branding and have seasonal sports themes like baseball, football, hockey, bowling, rodeo, racing, boxing, fishing, MMA, and many others or use non-sport themes like slot reels, bingo, roulette, and more. What's more, the invention's Network sponsors can be embedded into the game content providing a way for them to sponsor the games and provide significant prizes to players.

22. An Interactive, Video Game Wall for Promotional Games: The video game wall is used at the culmination of the invention's bonusing game tournaments to obtain next bracket winners. Brackets are played in weekly, monthly, and quarterly finals. The walls have a front side and a backside. The front side is the interactive playing side. There are video analytic, 3D motion-sensing cameras to capture the Player's gestures and interaction. The games are played out on LCD, LED, OLED, or similar displays with a touchscreen overlay. Vinyl is used for the casino or lottery operator's branding. The backside of the wall is used for guest registration and check-in for their playoff heat and for loyalty club enrollments at any other time. The back of the wall comes with an LCD, LED, OLED, or similar display with touchscreen capabilities. Vinyl is used for the casino or lottery operator's branding. The back also has a card reader to read loyalty or ID cards, a receipt printer, and an HD camera for analytics on users passing by or using the display.

A dual-sided structure of varying sizes incorporating specialized systems and interactive game content for total engagement of players. The front side has one or more large-format LCD or LED displays to display the video game content. The backside has one or more large-format LCD or LED displays for player registration. The front side has motion sensing input devices whereby players can interact with gestures and play the custom-developed digital games that appear on the displays.

There are several sizes and orientations for the wall to provide a fit for every property footprint. • A portrait wall holds one (1) 80" or larger display on the front and one (1) 55" or larger display on the back as a single registration touchpoint. It stands in landscape orientation. • A small wall holds one (1) 80" or larger display on the front and two (2) 46" or larger displays on the back as registration touchpoints. It stands in landscape orientation. •A medium wall holds a 2×2 video wall display on the front and three (3) 46" or larger displays on the back as registration touchpoints. It stands in landscape orientation. • A large wall holds a 4×4 video wall display on the front and three (3) 46" or larger displays on the back as registration touchpoints. It stands in landscape orientation.

23. Hardware and Software Interfaces: Hardware interfaces are used to interface with electronic gaming machines, to process blockchain transactions and perform analytics on metadata. Software interfaces are used to interface with various software used by Casino, Lottery, and iGaming Operators. Hardware interfaces with electronic gaming machines, lottery vending machines, geolocation beacons, cash machines, and other similar systems.

Software interfaces with Casino, Lottery, and iGaming Operator systems such as slot management systems, loyalty systems, lottery operations systems, and others.

24. An Intelligent Playout: Intelligent content is not a new concept. The term's widely accepted definition was developed years ago. Intelligent content moves away from humans needing to touch every piece of content at every instance of use. Instead, intelligent content moves toward an advanced publishing process that leans on data and metadata, that coordinates content efforts across departmental silos, and that makes smart use of technology—including, increasingly, artificial intelligence and machine learning.

Considering that the invention's Network at scale will be operating upon millions of devices advertising many different products, many different product lines, displayed in many languages, with many locales per language, presenting to numerous audiences per product line and locale and language, the complexities of content production become very painful very fast.

Content provided by the invention is made more intelligent across the ecosystem by, among other things, the following: 1. Intelligent content can be output to multiple channels, adapting to the needs of the channel and the recipients—with little or no human intervention. 2. Intelligent content reduces development, review, and maintenance costs. 3. Intelligent content reduces translation-related costs. 4. Intelligent content increases consistency and quality. 5. Intelligent content frees content creators to add value through innovation instead of rewriting existing elements of content—or copying and pasting them. 6. Intelligent content makes content more manageable throughout the content life cycle. 7. Intelligent content delivers the right information to the right customers in the right format at the right time throughout the customer journey.

The invention's Network employs technologies and tools (XML, DITA, and other content standards, authoring tools, content management systems) and employs a comprehensive process for implementing intelligent content.

25. A Location-Based Search (LBS) interface: Indoor location-based search (LBS) is growing as a natural extension of location-based search and marketing. Indoor LBS makes use of WLAN, ultra-wideband, Bluetooth, and Wi-Fi for interacting with mobile devices. These are highly accurate positioning technologies that are inexpensive to deploy. LBS is used in the invention to drive real insight from data tied to a specific location where activities take place. The invention interfaces with LBS to implement location-based mobile advertising to offer coupons or advertising directed at customers based on their current location.

Interfacing with proximity-based notification (push or pull) services the invention can market a Casino, Lottery, or iGaming Operator's social events via alerts sent to users, can direct users to the nearest publisher's location, or send notifications of sales, jackpots, or publisher locations all based on proximity to those events. The invention can use proximity-based actuation (push or pull) to automatically register users into sponsored offers and location-based games.

Mobile messaging plays an essential role in LBS. Messaging, especially SMS, has been used in combination with various LBS applications, such as location-based mobile advertising. SMS is still the main technology carrying mobile advertising and marketing campaigns to mobile phones. A classic example of LBS applications using SMS is the delivery of mobile coupons or discounts to mobile subscribers who are near to advertising restaurants, cafes, or movie theatres. The invention combines LBS Messaging with the shareable, digital, augmented reality or virtual reality coupon solution and the invention's interactive augmented reality and virtual reality marketing solutions.

26. A Consumer Behavior and Profile Modeling Service: Customer behavior modeling identifies behaviors among groups of customers to predict how similar customers will behave under similar circumstances. Customer behavior models are typically based on data mining of customer data and each model is designed to answer one question at one point in time. For example, a customer model can be used to predict what a group of customers will do in response to a marketing action. If the model is sound and the marketer follows the recommendations it generated, then the marketer will observe that most of the customers in the group responded as predicted by the model.

The invention employs customer behavior modeling using a combination of the following capabilities: • Segmenting customers into small groups and addressing individual customers based on actual behaviors—instead of hard-coding any preconceived notions or assumptions of what makes customers like one another, and instead of only looking at aggregated/averaged data which hides important facts about individual customers. • Tracking customers and how they move among different segments over time (i.e., dynamic segmentation), including customer lifecycle context and cohort analysis—instead of just determining in what segments customers are now without regard for how they arrived there. Accurately predicting the future behavior of customers (e.g., convert, churn, spend more, spend less) using predictive customer behavior modeling techniques—instead of just looking in the rear-view mirror of historical data. • Using advanced calculations to determine the lifetime value (LTV) of every customer and basing decisions on it—instead of looking only at the short-term revenue that a customer may bring the business. • Knowing, based on objective metrics, exactly what marketing actions to do now, for each customer, to maximize the long-term value of every customer—instead of trying to figure out what to do based on a dashboard or pile of reports. • Employing machine learning technologies that can reveal insights and make recommendations for improving customer marketing that human marketers are unlikely to spot on their own.

27. A Biometrics Interface: Biometrics, the science of tracking and analyzing people's unique biological characteristics, help the invention to identify customers and deliver personalized messaging.

Taking advantage of facial recognition and other biometric applications enables the invention to use the technology to offer campaigns that engage consumers. Providing advertising efforts that depend on consumer participation is not only more meaningful; they also create a more symbiotic relationship between brand and consumer.

28. A Casino Systems Interface: A Casino Management System (CMS) serves as a focal point for the day-to-day processing and recording of operational transactions throughout the facility. Casino applications that the invention will integrate with include Slot Accounting, Slot Ticketing, Cashless Gaming, eGames Platforms, RFID Table Monitoring, Live Point of Sale Systems for Keno, Bingo, Race, and Sports Book, Promotional Kiosks, Hotel, Food and Beverage Point of Sale, Surveillance and Security, Responsible Gaming, On-line Internet Gaming, Third-Party Check Cashing, General Ledger, and Data Warehousing just to mention a few.

29. A Lottery Operation Systems Interface: Lotteries are continuing to move towards mobile gaming. The benefit of mobile gaming is that consumers can access the lottery anytime and anywhere on their mobile phones, opening a huge new distribution channel for lottery distributors and operators. Registered players can play the lottery, process winning tickets to their account, and withdraw funds all from the convenience of their phone. SMS notifications can be set up to alert players to winning numbers. Finally, consumers need not worry about security: all transactions occur over $1^{st}$-level security in case the phone is ever lost or stolen. Going mobile also lends to revenues from advertisements placed by the invention's SSP.

30. Shareable, Digital Coupons Utilizing Augmented Reality and/or Virtual Reality: Augmented Reality (AR) is the application of technology and a combination of computer-generated content with a real-world view from a device (i.e. smartphone, tablet) in real-time. AR allows users a life-like experience with augmented objects by interacting with them as they would real objects. Virtual reality is a simulated experience that can be similar to or completely different from the real world. Applications of virtual reality can include entertainment and educational purposes. Other, distinct types of VR-style technology include augmented reality and mixed reality Interaction can include moving augmented characters or objects and recording real-time video with the AR experience captured. AR coupons superimpose an image or animation onto a mobile device's digital camera screen whereby images like advertisements printed on gaming vouchers, direct mail pieces, kiosk transaction receipts or point of sale receipts instantly become digital experiences. Standard virtual reality systems use either virtual reality headsets or multi-projected environments to generate realistic images, sounds and other sensations that simulate a user's physical presence in a virtual environment. A person using virtual reality equipment can look around the artificial world, move around in it, and interact with virtual features or items. The effect is commonly created by VR headsets consisting of a head-mounted display with a small screen in front of the eyes, but can also be created through specially designed rooms with multiple large screens. These artificial worlds can be comprised of the Casino, Lottery, or iGaming Operator's brand and simulations or even of sponsored advertiser brands.

These digital coupons are also shareable as users are encouraged to share the coupon value with others via text, email, or social media. The total number of scans, the number of unique users, the length of time a user spends on the app, click-through rates, the number of shares, location, and time of scans are all tracked in one or more databases.

31. Intelligent Offering Services: The invention integrates with the Casino, Lottery, or iGaming Operator's CRMs to connect with customers across devices and channels and provide personalized messages and offers. Standardizing offers based upon CRM and Loyalty programs, activating dormant consumers and providing offer value testing to allow testing of different offer values against consumer behavior and profile models.

32. Artificial Intelligence with Machine Learning Services: Artificial Intelligence (AI) and Machine Learning (ML) provides for AI-driven Content Curation which learns patterns of users' content and uses those patterns to create more content of the same type. Machines use users' activity patterns to learn about their interests and habits which the AI then assembles into an idea of what the users are most interested in seeing. This can include best-fit offers and content, as well as personalized push notifications alerting users to sales.

With the power of machine learning, AI can take a group of customers, and segment them as needed, creating unique algorithms from hundreds of thousands of data points—ultimately giving marketers a detailed picture of their market in record time.

Machine learning enables programmatic algorithms to make decisions in real-time, based on large volumes of data and applies to; Audience Targeting: Advertisers use machine learning techniques for single instance profiling, targeting individuals using data points like behavioral information and personal preferences. This helps in delivering one-to-one programmatic interactions; to Customer-Centric Personalization: Using individual data collected, advertisers can create ads targeted at a specific customer. Tailor-made ads and recommendations can lead to hyper-personalization.

33. Business Intelligence and Cognitive Search Engine: Business intelligence (BI) dashboards are hosted software applications that automatically pull together the available data into charts and graphs that give a sense of the immediate state of the advertising campaigns. BI leverages software and services to transform data into actionable insights that inform strategic and tactical business decisions. BI tools access and analyze data sets and present analytical findings in reports, summaries, dashboards, graphs, charts, and maps to provide users with detailed intelligence about the state of their campaigns. Intelligent search engines are hosted software applications that scour the massive sets of data collected from the invention's multitude of systems acting as a Discovery and Recommendation service purpose-built to leverage the complex data relationships.

The Blockchain Technology: The invention's Digital Ledger Technology (DLT) tracks and grades advertising inventory and impressions with full fraud and non-human activity detection. The invention's blockchain is a distributed operating system for permissioned blockchains that executes distributed applications written in general-purpose programming languages (e.g., Go, Java, Nodejs). The invention's blockchain allows components, such as consensus and membership services, to be plug-and-play. Its modular and versatile design satisfies a broad range of advertising industry use cases. It offers a unique approach to the consensus that enables performance at scale while preserving privacy.

The invention's blockchain is an extensible blockchain system for running distributed applications. It supports modular consensus protocols, which allows the system to be tailored to particular use cases and trust models. It also runs distributed applications written in standard, general-purpose programming languages, without systemic dependency on a native cryptocurrency. The invention's blockchain realizes the permissioned model using a portable notion of membership, which may be integrated with industry-standard identity management.

The invention's blockchain is a private blockchain, with permissioned access controls, smart contracts with state channels, and secure decentralized data storage to create a versatile and robust infrastructure that is reliable under a high ad transaction load.

The invention's blockchain channel is a private "subnet" of communication between two or more specific network members, to conduct private and confidential transactions. A channel is defined by members (organizations), anchor peers per member, the shared ledger, Chaincode application(s), and the ordering service node(s). Each transaction on the network is executed on a channel, where each party must be authenticated and authorized to transact on that channel. Each peer that joins a channel, has its own identity given by a membership services provider (MSP), which authenticates each peer to its channel peers and services.

The invention's blockchain architecture delivers the following advantages: • Chaincode trust flexibility. The architecture separates trust assumptions for Chaincodes (blockchain applications) from trust assumptions for ordering. In other words, the ordering service may be provided by one set of nodes (orderers) and tolerate some of them to fail or misbehave, and the endorsers may be different for each Chaincode. • Scalability. As the endorser nodes responsible for particular Chaincode is orthogonal to the orderers, the system may scale better than if these functions were done by the same nodes. In particular, this results when different Chaincodes specify disjoint endorsers, which introduces a partitioning of Chaincodes between endorsers and allows parallel Chaincode execution (endorsement). Besides, Chaincode execution, which can potentially be costly, is removed from the critical path of the ordering service. • Confidentiality. The architecture facilitates the deployment of Chaincodes that have confidentiality requirements concerning the content and state updates of its transactions. • Consensus modularity. The architecture is modular and allows pluggable consensus (i.e., ordering service) implementations. The invention's blockchain tokens will become the basic tokens for advertising within the invention's ecosystem. Most payments, exchanges, incentives, and fees on the invention's digital advertising network will require the token.

Token Utility: The invention's token is an ERC20-compliant utility token usable within the invention's Network for making advertiser payments for ad campaigns, compensation for publishers, paying service fees to ecosystem participants, and including DSPs, SSPs, Auditors, and other providers of specific services within the ecosystem.

ERC20 is a widely tested and accepted standard in Ethereum and incorporating it in the invention's blockchain can make the task of writing a secure and scalable Chaincode for any token based on the invention's blockchain easy.

A Supply-Side Platform (SSP) is a piece of software used by digital publishers to help them sell advertising in an automated fashion. SSPs allow publishers to connect their inventory to multiple ad exchanges, Demand-Side Platforms (DSP), and networks at once allowing a huge range of potential buyers to purchase ad space and for publishers to get the highest possible rates.

Connections of Main Elements and Sub-Elements of Invention: All connections between main and sub-elements are via TCP/IP or UDP connections over varying media formats.

Operation of a Preferred Embodiment: Casinos have thousands of latent digital displays on their property with little-to-no means for monetization. Lottery operators have locations where deploying displays simply for digital signage is not cost-efficient. Casino, Lottery, and iGaming Operators are missing out on this lucrative, emerging opportunity for generating advertising revenue. iGaming providers, including non-cash social gaming, cash wager gaming, and online sportsbooks are often so focused on their platforms and compliance with regulatory bodies they overlook the additional revenue stream of digital ads. Many of the currently popular mobile applications sell ads as their sole source of revenue. This mass audience of casino patrons is a sizable market highly coveted by advertisers.

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based.

In still further embodiments, a database is cloud computing-based. In other embodiments, a database is based on one or more local computer storage devices.

General Information Relating to Various Embodiments of the Invention

A controller, microcontroller, computing device, or computer, such as described herein, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

In some embodiments, a controller may include a processor, which as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Other aspects and features of the invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Those skilled in the art will readily appreciate that the systems and methods described herein may be a standalone system, gaming device, gaming machine or incorporated in an existing gaming system or machine. The gaming machine of the invention may include various computer and network related software and hardware, such as programs, operating systems, memory storage devices, data input/output devices, data processors, servers with links to data communication systems, wireless or otherwise, and data transceiving terminals. It should also be understood that any method steps discussed herein, such as for example, steps involving the receiving or displaying of data, may further include or involve the transmission, receipt and processing of data through conventional hardware and/or software technology to effectuate the steps as described herein. Those skilled in the art will further appreciate that the precise types of software and hardware used are not vital to the full implementation of the methods of the invention so long as players and operators thereof are provided with useful access thereto, either through a mobile device, gaming platform, or other computing platform via a local network or global telecommunication network.

Although specific features of various embodiments of the invention may be shown in some drawings and not in others, this is for convenience only. In accordance with the principles of the invention, any feature of a drawing may be referenced and/or claimed in combination with any feature of any other drawing.

Those skilled in the art will readily appreciate that the apparatus described herein may include various computer and network related software and hardware, such as programs, operating systems, memory storage devices, data input/output devices, data processors, servers with links to data communication systems, wireless or otherwise, and data transceiving terminals.

As used herein, and unless the context dictates otherwise, the term "configured to" or "coupled to" is intended to include both direct coupling (in which two elements that are coupled to each other contact each other) and indirect coupling (in which at least one additional element is located between the two elements). Therefore, the terms "configured to", "configured with", "coupled to" and "coupled with" are used synonymously. Within the context of this document terms "configured to", "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

No language in the specification should be construed as indicating any non-disclosed element as essential to the practice of the invention.

It will be apparent to those skilled in the art that various modifications and variations can be made to the present invention without departing from the spirit and scope of the invention. There is no intention to limit the invention to the specific form or forms enclosed. On the contrary, the intention is to cover all modifications, alternative constructions, and equivalents falling within the spirit and scope of the invention disclosed herein. Thus, it is intended that the present invention cover the modifications and variations of this invention, provided they are within the scope of the embodiments herein, the claims and their equivalents.

The invention claimed is:

1. A system for providing blockchain-based digital advertising and marketing platform for Casinos, Lottery, and iGaming Operators, comprising:
 a) one or more processing devices and one or more data communication devices in communication with a private and permissioned blockchain network, the private and permissioned blockchain network comprising (i) a membership services provider enabled by the one or more processing devices and configured to assign an identity to transacting parties on the private and permissioned blockchain network, whereby all transacting parties have assigned identities, (ii) a central network operator enabled by the one or more processing devices and configured to form a subchannel within the private and permissioned blockchain network to initiate the execution of a transaction between transacting parties through the private and permissioned blockchain network and restrict readable access to the transaction to the transacting parties, and (iii) a chaincode application enabled by the one or more processing device and configured to authenticate and authorize the transaction for execution by comparing the identity of the transacting parties in the subchannel with the assigned identities, wherein the chaincode application is configured to restrict readable access to content and state updates associated with the transaction;

b) a supply-side platform, comprising a server and memory configured to store advertisement content, the advertisement content being displayable on a display device, wherein the supply-side platform is accessible to receive the advertisement content from transacting parties on the blockchain network responsive to the execution of a transaction through the private and permissioned blockchain network;

c) a demand-side platform in communication with the supply-side platform, the demand-side platform including a server and memory, wherein the demand-side platform is configured to access the advertisement content and transmit the advertisement content;

d) a dynamic content generator application software residing in one of the supply-side platform or the demand-side platform, the application software being configured to operate using artificial intelligence and machine learning, business intelligence software and search engine technology in response to user interaction, to provide advertisement content from the demand-side platform to transacting parties responsive to the execution of a transaction through the private and permissioned blockchain network in accordance with an advertising rules service, the advertising rules service defining the advertisement content to be displayed to one or more users, wherein the advertisement content comprises a display of gamified product offers, coupons and mailers utilizing augmented reality or virtual reality, and an interactive game wall, wherein the user interaction is received from the one or more users interactions with one or more electronic gaming machines, and wherein the advertisement content is displayed to the one or more users on a display device associated with at least one electronic gaming machine of the one or more electronic gaming machines responsive to receiving a user identification at the at least one electronic gaming machine, the user identification enabling access to a user account.

* * * * *